US012734773B2

(12) United States Patent
Shih et al.

(10) Patent No.: US 12,734,773 B2
(45) Date of Patent: Sep. 15, 2026

(54) METHOD FOR PREPARING A CONTACT LENS CONTAINING DEPROTECTED ULTRAVIOLET BLOCKERS

(71) Applicant: Bausch + Lomb Ireland Limited, Dublin (IE)

(72) Inventors: Feng-Yang Shih, Rochester, NY (US); Mohammad Vatankhah Varnosfaderani, Rochester, NY (US); Alok Kumar Awasthi, Pittsford, NY (US)

(73) Assignee: BAUSCH + LOMB IRELAND LIMITED, Dublin (IE)

( * ) Notice: Subject to any disclaimer, the term of this patent is extended or adjusted under 35 U.S.C. 154(b) by 270 days.

(21) Appl. No.: 18/422,180

(22) Filed: Jan. 25, 2024

(65) Prior Publication Data

US 2024/0302569 A1 Sep. 12, 2024

Related U.S. Application Data

(60) Provisional application No. 63/450,744, filed on Mar. 8, 2023.

(51) Int. Cl.
*B29D 11/00* (2006.01)
*G02B 1/04* (2006.01)
*G02C 7/04* (2006.01)

(52) U.S. Cl.
CPC .. *B29D 11/00038* (2013.01); *B29D 11/00125* (2013.01); *G02B 1/043* (2013.01); *G02C 7/049* (2013.01)

(58) Field of Classification Search
None
See application file for complete search history.

(56) References Cited

U.S. PATENT DOCUMENTS 3,408,429 A 10/1968 Wichterle
3,660,545 A 5/1972 Wichterle
4,113,224 A 9/1978 Clark et al.
4,136,250 A 1/1979 Mueller et al.
4,153,641 A 5/1979 Deichert et al.
4,197,266 A 4/1980 Clark et al.
4,304,895 A * 12/1981 Loshaek ................ G02B 5/208 351/159.63
4,740,533 A 4/1988 Su et al.
4,910,277 A 3/1990 Bambury et al.
4,954,587 A 9/1990 Mueller
5,010,141 A 4/1991 Mueller
5,034,461 A 7/1991 Lai et al.
5,070,215 A 12/1991 Bambury et al.
5,079,319 A 1/1992 Mueller
5,260,000 A 11/1993 Nandu et al.
5,271,875 A 12/1993 Appleton et al.
5,310,779 A 5/1994 Lai
5,321,108 A 6/1994 Kunzler et al.
5,358,995 A 10/1994 Lai et al.
5,387,662 A 2/1995 Kunzler et al.
5,449,729 A 9/1995 Lai
5,512,205 A 4/1996 Lai
5,610,252 A 3/1997 Bambury et al.
5,616,757 A 4/1997 Bambury et al.
5,708,094 A 1/1998 Lai et al.
5,710,302 A 1/1998 Kunzler et al.
5,714,557 A 2/1998 Kunzler et al.
5,776,999 A * 7/1998 Nicolson ................ A61L 27/26 528/33
5,908,906 A 6/1999 Kunzler et al.
5,914,355 A 6/1999 Kunzler
5,945,465 A * 8/1999 Ozark .................... G02B 1/043 526/261
7,915,323 B2 3/2011 Awasthi et al.
7,994,356 B2 8/2011 Awasthi et al.
8,420,711 B2 4/2013 Awasthi et al.
8,703,891 B2 4/2014 Broad
8,827,447 B2 9/2014 Awasthi et al.
8,937,110 B2 1/2015 Alli et al.
8,937,111 B2 1/2015 Alli et al.
9,039,174 B2 5/2015 Awasthi et al.
9,156,934 B2 10/2015 Alli et al.
9,244,197 B2 1/2016 Alli et al.
9,315,669 B2 4/2016 Holland et al.
9,389,336 B2 * 7/2016 Shrestha ................ G02B 1/043
11,066,530 B2 * 7/2021 DiBella, Jr. .............. C08J 7/065
2010/0296051 A1 11/2010 Christ

FOREIGN PATENT DOCUMENTS

CN 203965744 U 11/2014
EP 1088246 B1 4/2001
WO 9631792 A1 10/1996

OTHER PUBLICATIONS

Lai, Yu-Chin, "The Role of Bulky Polysiloxanylalkyl Methacryates in Polyurethane-Polysiloxane Hydrogels," Journal of Applied Polymer Science, 1996, pp. 1193-1199, vol. 60.
PCT/EP2024/052303, International Search Report & Written Opinion, Jul. 12, 2024, 13 pages.

* cited by examiner

*Primary Examiner* — Benjamin A Schiffman
(74) *Attorney, Agent, or Firm* — Michael E. Carmen; John E. Thomas

(57) ABSTRACT

A method for preparing a contact lens containing an ultraviolet (UV) blocker is disclosed. The method involves (a) polymerizing a monomeric mixture comprising (i) one or more contact lens-forming comonomers, and (ii) one or more UV blockers comprising a phenolic group having a protected hydroxyl moiety and one or more ethylenically unsaturated reactive groups to obtain a polymerization product comprising the one or more UV blockers comprising a phenolic group having a protected hydroxyl moiety, and (b) deprotecting the protected hydroxyl moiety of the one or more UV blockers of the polymerization product.

20 Claims, No Drawings

METHOD FOR PREPARING A CONTACT LENS CONTAINING DEPROTECTED ULTRAVIOLET BLOCKERS

PRIORITY CLAIM

The present application claims priority to U.S. Provisional Patent Application Ser. No. 63/450,744, entitled "Contact Lens Containing Deprotected Ultraviolet Blockers," filed Mar. 8, 2023, the content of which is incorporated by reference herein in its entirety.

BACKGROUND

It is well known that sunlight may damage the human eye, especially in connection with the formation of cataracts and age-related macular degeneration which can lead to loss of vision. To minimize ultraviolet (UV) damage to the eyes, a subject can wear eye glasses or contact lenses that are protective against peripheral radiation. The degree of blocking however depends on the type of lens and the design of the sunglasses. Most styles of sunglasses do not offer complete protection from UV radiation, thereby allowing UV to reach the eyes around the frames of the eyeglasses. By wearing UV blocking contact lenses, which cover the entire cornea, UV protection from all angles can be obtained.

In the fraction of sunlight, the long wave and near ultraviolet (UVA and UVB) range are most concerned, which are characterized by a wavelength of 280 to 380 nanometers (nm). The U.S. Food and Drug administration (FDA) has established standards for UV blocking contact lenses based on American National Standards Institute (ANSI) standards. In particular, the FDA classifies UV blocking contact lenses into two categories, Class I and Class II, depending on the extent of the protection. Class I contact lenses must block more than 90% of UVA, i.e., 316 to 380 nm, and 99% of UVB, i.e., 280 to 315 nm, radiation. Class II lenses must block more than 50% of UVA and 95% of UVB radiation. Although UVA radiation corresponds to the wavelength range of 316 to 400 nm, only wavelengths from 316 to 380 nm are considered for classification of a contact lens.

SUMMARY

In accordance with an illustrative embodiment, a method for preparing a contact lens containing an ultraviolet (UV) blocker, comprises:

(a) polymerizing under ultraviolet polymerization conditions a monomeric mixture comprising (i) one or more contact lens-forming comonomers, and (ii) one or more UV blockers comprising a phenolic group having a protected hydroxyl moiety and one or more ethylenically unsaturated reactive groups to obtain a polymerization product comprising the one or more UV blockers comprising a phenolic group having a protected hydroxyl moiety, and (b) deprotecting the protected hydroxyl moiety of the one or more UV blockers of the polymerization product.

In accordance with another illustrative embodiment, a contact lens comprising one or more UV blockers comprising a phenolic group comprising a deprotected hydroxyl moiety which is an extracted and/or autoclaved, ultraviolet (UV) cured polymerization product of a monomeric mixture comprising (a) one or more contact lens-forming comonomers, and (b) one or more ultraviolet (UV) blockers comprising a phenolic group having a protected hydroxyl moiety and one or more ethylenically unsaturated reactive groups.

DETAILED DESCRIPTION

Various illustrative embodiments described herein are directed to contact lenses containing an ultraviolet (UV) blocker and methods for their preparation.

In the field of contact lenses, the UV-blocking property of the contact lens has become a desired feature. The UV-blocking property of contact lenses is usually enhanced by adding one or more UV blockers in the contact lens-forming monomeric mixture. Generally, a contact lens can be prepared by a curing process utilizing either a UV-radiation or thermal method, depending on the type of initiator (i.e., photo or thermal) in the contact lens-forming monomeric mixture. When forming the contact lens with the desired UV-blocking property, the UV blockers become an essential component in the monomeric mixture. However, the presence of a UV blocker in the monomeric mixture can significantly inhibit the initiation of the UV radical initiator and the propagation of free radical polymerization by blocking UV exposure and reducing the lifetime of the UV radical species.

For example, UV blockers generally are aromatic compounds consisting of at least a phenolic group and a (hetero) aromatic ring with a strong absorbance peak at UVA (316 to 400 nm) and UVB (280 to 315 nm) ranges. Phenolic compounds are typically used as radical inhibitors due to their well-known radical scavenging ability, e.g., butylated hydroxytoluene, hydroquinone, etc. As these UV blockers have both UV-blocking and radical-inhibiting abilities, they will limit the efficiency of the UV curing process during polymerization to form the contact lens.

Accordingly, the non-limiting illustrative embodiments described herein overcome the foregoing drawbacks by employing a protected UV blocker in the monomeric mixture when forming the contact lenses described herein to inhibit and/or prevent the abilities of the UV blockers during the UV curing process. By functionalizing a hydroxyl group on the phenolic group of the UV blocker with a protecting group, the hydroxyl protected UV blocker can significantly reduce the ability of radical scavenging and blue-shift the UV-absorbance range through intramolecular hydrogen-bonding. The existence of intramolecular hydrogen-bonding enhances the planarity of a conjugated system and red-shift the peak of UV absorbance. It is believed that functionalizing the hydroxyl group on the phenolic group of the UV blocker with hydrolysis-able bulky protecting groups (e.g., trimethylsilyl, ethoxycarbonyloxy, and t-butyloxycarbonyl groups) can destroy the intramolecular hydrogen-bond and enhance steric hinderance between aromatic rings, thereby blue-shifting the peak of UV absorbance out of the range of UV absorbance photo initiators (e.g., Irgacure 819). In addition, the illustrative embodiments described herein are based on the surprising discovery that the resulting deprotected UV blocking contact lens demonstrates sufficient blocking of UV to meet both FDA Class I and II specifications for UV blocking after the protected UV blocker is deprotected utilizing extraction and/or autoclaving techniques.

In non-limiting illustrative embodiments, a contact lens as described herein containing one or more UV blockers are obtained by (a) polymerizing a monomeric mixture comprising (i) one or more contact lens-forming comonomers, and (ii) one or more UV blockers comprising a phenolic group having a protected hydroxyl moiety and one or more ethylenically unsaturated reactive groups under UV curing to obtain a UV cured polymerization product comprising the one or more UV blockers comprising a phenolic group having a protected hydroxyl moiety, and (b) deprotecting the protected hydroxyl moiety of the one or more UV blockers of the polymerization product.

In accordance with a non-limiting illustrative embodiment, the one or more contact lens-forming comonomers can be present in the monomeric mixture in a major amount. In accordance with a non-limiting illustrative embodiment, the one or more contact lens-forming comonomers can be present in the monomeric mixture in an amount ranging from about 70 wt. % to about 95 wt. %, based on the total weight of the monomeric mixture. In another illustrative embodiment, the one or more contact lens-forming comonomers can be present in the monomeric mixture in an amount ranging from about 85 wt. % to about 95 wt. %, based on the total weight of the monomeric mixture.

The one or more contact lens-forming comonomers for use in the monomeric mixture can be any contact lens-forming comonomer material known in the art capable of forming a contact lens as described above. In an illustrative embodiment, the one or more contact lens-forming comonomers can be one or more contact lens-forming hydrophilic comonomers. Suitable one or more contact lens-forming hydrophilic comonomers include, for example, unsaturated carboxylic acids, acrylamides, vinyl lactams, hydroxyl-containing-(meth)acrylates, hydrophilic vinyl carbonates, hydrophilic vinyl carbamates, hydrophilic oxazolones, and poly(alkene glycols) functionalized with polymerizable groups and the like and mixtures thereof.

As used herein, the term "(meth)" denotes an optional methyl substituent. Thus, terms such as "(meth)acrylate" denotes either methacrylate or acrylate, and "(meth)acrylamide" denotes either methacrylamide or acrylamide.

Representative examples of unsaturated carboxylic acids include, but are not limited to, methacrylic acid, acrylic acid and the like and mixtures thereof. Representative examples of acrylamides include, but are not limited to, alkylamides such as N,N-dimethylacrylamide, N,N-dimethylmethacrylamide and the like and mixtures thereof. Representative examples of cyclic lactams include, but are not limited to, N-vinyl-2-pyrrolidone, N-vinyl caprolactam, N-vinyl-2-piperidone and the like and mixtures thereof. Representative examples of hydroxyl-containing (meth)acrylates include, but are not limited to, 2-hydroxyethyl methacrylate (HEMA), glycerol methacrylate and the like and mixtures thereof. Additional contact lens-forming hydrophilic comonomers include, for example, the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable contact lens-forming hydrophilic comonomers will be apparent to one skilled in the art. Mixtures of the foregoing contact lens-forming hydrophilic comonomers can also be used in the monomeric mixtures herein.

In accordance with one or more additional non-limiting illustrative embodiments, as may be combined with one or more of the preceding paragraphs, the one or more contact lens-forming hydrophilic comonomers can be present in the monomeric mixture in an amount ranging from about 20 wt. % to about 80 wt. %, based on the total weight of the monomeric mixture. In another illustrative embodiment, the one or more contact lens-forming hydrophilic comonomers can be present in the monomeric mixture in an amount ranging from about 30 wt. % to about 60 wt. %, based on the total weight of the monomeric mixture.

In accordance with one or more additional non-limiting illustrative embodiments, as may be combined with one or more of the preceding paragraphs, the one or more contact lens-forming comonomers can be one or more contact lens-forming silicone comonomers. Representative contact lens-forming silicone comonomers for use in the formation of, for example, silicone hydrogels, are well known in the art and numerous examples are provided in U.S. Pat. Nos. 4,136,250; 4,153,641; 4,740,533; 5,034,461; 5,070,215; 5,260,000; 5,310,779; and 5,358,995. Specific examples of suitable materials for use herein include those disclosed in U.S. Pat. Nos. 5,310,779; 5,387,662; 5,449,729; 5,512,205; 5,610,252; 5,616,757; 5,708,094; 5,710,302; 5,714,557 and 5,908,906, the contents of which are incorporated by reference herein.

In an illustrative embodiment, as may be combined with one or more of the preceding paragraphs, the contact lens-forming silicone comonomers can include, as a class of representative contact lens-forming silicone comonomers, one or more non-bulky organosilicon-containing monomers. An "organosilicon-containing monomer" as used herein contains at least one [siloxanyl] or at least one [silyl-alkyl-siloxanyl] repeating unit, in a monomer, macromer or prepolymer. In an illustrative embodiment, an example of a non-bulky organosilicon-containing monomers is represented by a structure of Formula Ia:

(Ia)

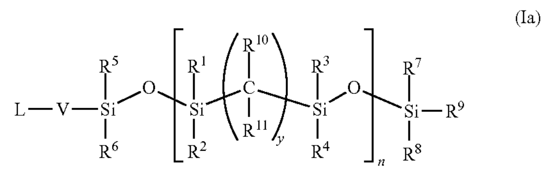

wherein L is ethylenically unsaturated polymerizable group, V is a linking group or a bond; $R^1$, $R^2$, $R^3$, $R^4$, $R^5$, $R^6$, $R^7$, $R^8$, and $R^9$ are independently hydrogen, an alkyl group, a haloalkyl group, a cycloalkyl group, a heterocycloalkyl group, an alkenyl group, a halo alkenyl group, or an aryl group; $R^{10}$ and $R^{11}$ are independently hydrogen or an alkyl group wherein at least one of $R^{10}$ and $R^{11}$ is hydrogen; y is 2 to 7 and n is 1 to 100 or from 1 to 20.

Ethylenically unsaturated polymerizable groups are well known to those skilled in the art. Suitable ethylenically unsaturated polymerizable groups include, for example, (meth)acrylates, vinyl carbonates, O-vinyl carbamates, N-vinyl carbamates, and (meth)acrylamides.

Linking groups can be any divalent radical or moiety and include, for example, substituted or unsubstituted $C_1$ to $C_{12}$ alkyl group, an alkyl ether group, an alkenyl group, an alkenyl ether group, a halo alkyl group, a substituted or unsubstituted siloxane group, and monomers capable of propagating ring opening.

In one embodiment, V is a (meth)acrylate, L is a $C_1$ to $C_{12}$ alkylene group, $R^1$, $R^2$, $R^3$, $R^4$, $R^5$, $R^6$, $R^7$, $R^1$, and $R^9$ are independently a $C_1$ to $C_{12}$ alkyl group, $R^{10}$ and $R^{11}$ are independently H or a $C_1$ to $C_{12}$ alkyl group, y is 2 to 7 and n is 3 to 8.

In one embodiment, V is a (meth)acrylate, L is a $C_1$ to $C_6$ alkyl group, $R^1$, $R^2$, $R^3$, $R^4$, $R^5$, $R^6$, $R^7$, $R^8$, and $R^9$ are independently a $C_1$ to $C_6$ alkyl group, $R^{10}$ and $R^{11}$ are independently H or a $C_1$ to $C_6$ alkyl group, y is 2 to 7 and n is 1 to 20.

Non-bulky organosilicon-containing monomers represented by a structure of Formula Ia are known in the art, see, e.g., U.S. Pat. Nos. 7,915,323, 7,994,356, 8,420,711, 8,827,447 and 9,039,174, the contents of which are incorporated by reference herein.

In an illustrative embodiment, as may be combined with one or more of the preceding paragraphs, the one or more non-bulky organosilicon-containing monomers can also comprise a compound represented by a structure of Formula Ib:

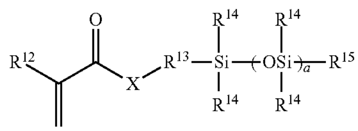

(Ib)

wherein $R^{12}$ is H or methyl; X is O or $NR^{16}$; wherein $R^{16}$ is selected from H, or $C_1$ to $C_4$ alkyl, which may be further substituted with one or more hydroxyl groups, and in some embodiments is H or methyl; $R^{13}$ is a divalent alkyl group, which may further be functionalized with a group selected from the group consisting of ether groups, hydroxyl groups, carbamate groups and combinations thereof, and in another embodiment a $C_1$ to $C_6$ alkylene group which may be substituted with ether, hydroxyl and combinations thereof, and in yet another embodiment a $C_1$ or $C_3$ to $C_4$ alkylene group which may be substituted with ether, hydroxyl and combinations thereof; each $R^{14}$ is independently a phenyl or a $C_1$ to $C_4$ alkyl group which may be substituted with fluorine, hydroxyl or ether, and in another embodiment each $R^{14}$ is independently selected from ethyl and methyl groups, and in yet another embodiment, each $R^{14}$ is methyl; $R^{15}$ is a $C_1$ to $C_4$ alkyl group; a is 2 to 50, and in some embodiments 5 to 15.

Non-bulky organosilicon-containing monomers represented by a structure of Formula Ib are known in the art, see, e.g., U.S. Pat. Nos. 8,703,891, 8,937,110, 8,937,111, 9,156,934 and 9,244,197, the contents of which are incorporated by reference herein.

Representative examples of the non-bulky organosilicon-containing monomers include at least the following compounds:

M1EDS6: a compound having the structure and available from Gelest:

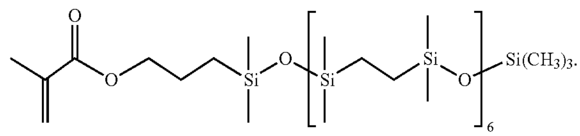

MCR-M11: a compound having the structure:

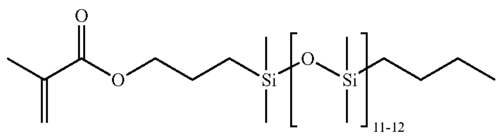

M1-MCR-C12: a compound having the structure:

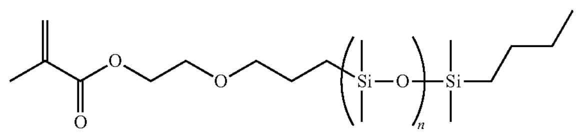

wherein n is an average of 12.

The foregoing non-bulky organosilicon-containing monomers are merely illustrative and any other known or future developed non-bulky organosilicon-containing monomers are contemplated herein.

In an illustrative embodiment, as may be combined with one or more of the preceding paragraphs, the one or more contact lens-forming silicone comonomers can include, as a class of representative contact lens-forming silicone comonomers, one or more bulky silicone-containing monomers. Suitable one or more bulky silicone monomers include, for example, one or more bulky siloxane monomers such as polysiloxanylalkyl (meth)acrylic monomers, bulky polysiloxanylalkyl carbamate monomers and mixtures thereof. In one embodiment, a representative example of a bulky silicone-containing monomer is represented by a structure of Formula II:

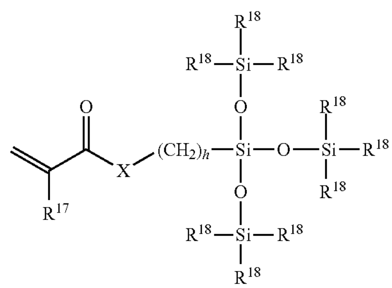

(II)

wherein X denotes —O— or —$NR^{19}$—, where each $R^{19}$ is hydrogen or a $C_1$-$C_4$ alkyl group; $R^{17}$ independently denotes hydrogen or methyl; each $R^{18}$ independently denotes a lower alkyl radical such as a $C_1$-$C_6$ group, a phenyl radical or a group represented by the following structure:

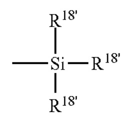

wherein each $R^{18'}$ independently denotes a lower alkyl radical or a phenyl radical; and h is 1 to 10; or is represented by a structure of Formula III:

(III)

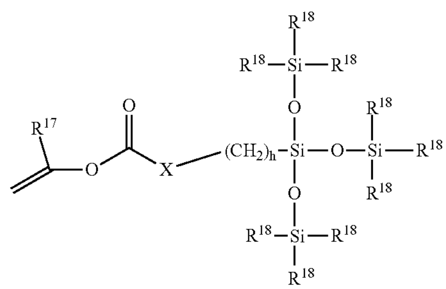

wherein X denotes —$NR^{19}$— wherein $R^{19}$ denotes hydrogen or a $C_1$-$C_4$ alkyl; $R^{17}$ denotes hydrogen or methyl; each $R^{18}$ independently denotes a lower alkyl radical, a phenyl radical or a group represented by the following structure:

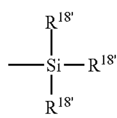

wherein each $R^{18'}$ independently denotes a lower alkyl radical or a phenyl radical; and h is 1 to 10.

Representative examples of bulky silicone-containing monomers include 3-methacryloyloxypropyltris(trimethylsiloxy)silane or tris(trimethylsiloxy)silylpropyl methacrylate, sometimes referred to as TRIS and tris(trimethylsiloxy)silylpropyl vinyl carbamate, sometimes referred to as TRIS-VC, pentamethyldisiloxanyl methylmethacrylate, phenyltetramethyl-disiloxanylethyl acetate, and methyldi(trimethylsiloxy)methacryloxymethyl silane, (3-methacryloxy-2-hydroxy propoxy)propyl bis(trimethyl siloxy)methyl silane, sometimes referred to as Sigma and the like and mixtures thereof. In one embodiment, the bulky silicone-containing monomer is a tris(trialkylsiloxy)silylalkyl methacrylate-containing monomer such as a tris(trimethylsiloxy)silylpropyl methacrylate-containing monomer.

Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

The foregoing bulky organosilicon-containing monomers are merely illustrative and any other known or future developed bulky organosilicon-containing monomers are contemplated herein.

In an illustrative embodiment, as may be combined with one or more of the preceding paragraphs, the one or more contact lens-forming silicone comonomers can include, as a class of representative contact lens-forming silicone comonomers, one or more silicone-containing vinyl carbonate or vinyl carbamate monomers. Suitable one or more silicone-containing vinyl carbonate or vinyl carbamate monomers include, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like and mixtures thereof.

In an illustrative embodiment, as may be combined with one or more of the preceding paragraphs, the one or more contact lens-forming silicone comonomers can include, as a class of representative contact lens-forming silicone comonomers, one or more polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," Journal of Applied Polymer Science, Vol. 60, 1193-1199 (1996). PCT Published Application No. WO 96/31792 discloses examples of such monomers, which disclosure is hereby incorporated by reference in its entirety. Further examples of silicone urethane monomers are represented by Formulae IV and V:

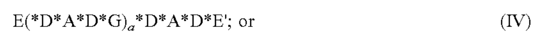

$$E(*D*A*D*G)_a*D*A*D*E'; \text{ or} \quad \text{(IV)}$$

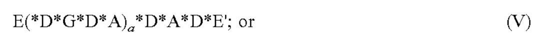

$$E(*D*G*D*A)_a*D*A*D*E'; \text{ or} \quad \text{(V)}$$

wherein:

D independently denotes an alkyl diradical, an alkyl cycloalkyl diradical, a cycloalkyl diradical, an aryl diradical or an alkylaryl diradical having 6 to about 30 carbon atoms;

G independently denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;

* denotes a urethane or ureido linkage;

a is at least 1;

A independently denotes a divalent polymeric radical of Formula VI:

(VI)

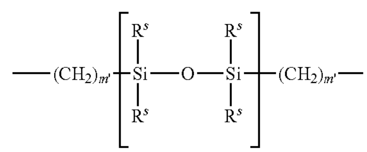

wherein each $R^s$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;

each of E and E' independently denotes a polymerizable unsaturated organic radical represented by Formula VII:

(VII)

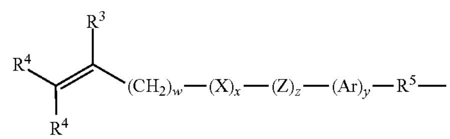

wherein: $R^3$ is hydrogen or methyl;

$R^4$ is hydrogen, an alkyl radical having 1 to 6 carbon atoms, or a —CO—Y—$R^6$ radical wherein Y is —O—, —S— or —NH—;

$R^5$ is a divalent alkylene radical having 1 to about 10 carbon atoms;

$R^6$ is a alkyl radical having 1 to about 12 carbon atoms;

X denotes —CO— or —OCO—;

Z denotes —O— or —NH—;

Ar denotes an aromatic radical having about 6 to about 30 carbon atoms;

w is 0 to 6; x is 0 or 1; y is 0 or 1; and z is 0 or 1.

In an illustrative embodiment, as may be combined with one or more of the preceding paragraphs, the one or more contact lens-forming silicone comonomers can include, as a class of representative contact lens-forming silicone comonomers, one or more silicone-containing urethane monomers represented by Formula VIII:

(VIII)

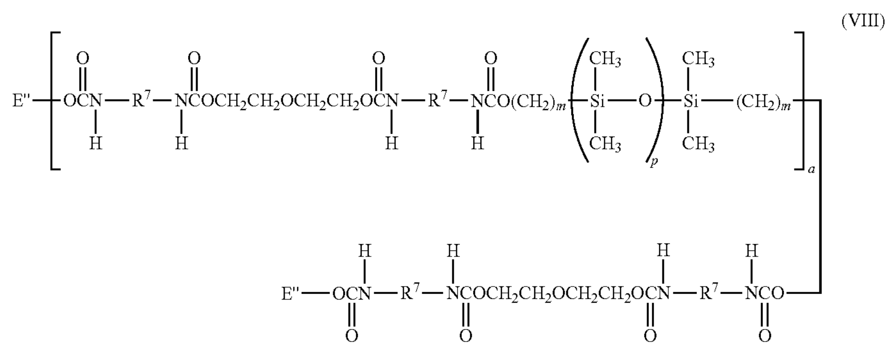

wherein m is at least 1 and is preferably 3 or 4, a is at least 1 and preferably is 1, p is a number which provides a moiety weight of about 400 to about 10,000 and is preferably at least about 30, $R^7$ is a diradical of a diisocyanate after removal of the isocyanate group, such as the diradical of isophorone diisocyanate, and each E" is a group represented by:

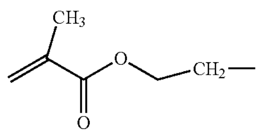

In another embodiment, a silicone hydrogel material comprises (in bulk, that is, in the monomer mixture that is copolymerized) about 5 to about 50 percent, or from about 10 to about 25 percent, by weight of one or more silicone macromonomers, about 5 to about 75 percent, or about 30 to about 60 percent, by weight of one or more polysiloxanyl-alkyl (meth)acrylic monomers, and about 10 to about 50 percent, or about 20 to about 40 percent, by weight of a hydrophilic monomer. In general, the silicone macromonomer is a poly(organosiloxane) capped with an unsaturated group at two or more ends of the molecule. In addition to the end groups in the above structural formulas, U.S. Pat. No. 4,153,641 discloses additional unsaturated groups, including acryloxy or methacryloxy. Fumarate-containing materials such as those disclosed in U.S. Pat. Nos. 5,310,779; 5,449,729 and 5,512,205 are also useful substrates in accordance with the non-limiting embodiments described herein. The silane macromonomer may be a silicone-containing vinyl carbonate or vinyl carbamate or a polyurethane-polysiloxane having one or more hard-soft-hard blocks and end-capped with a hydrophilic monomer.

In an illustrative embodiment, as may be combined with one or more of the preceding paragraphs, the one or more contact lens-forming silicone comonomers can include, as a class of representative contact lens-forming silicone comonomers, one or more monomers of Formula IX:

(IX)

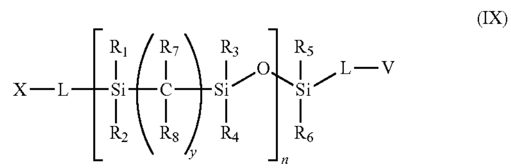

wherein X is the residue of a ring opening agent; L is the same or different and is a linking group or a bond; V is an ethylenically unsaturated polymerizable group; $R_1$, $R_2$, $R_3$, $R_4$, $R_5$, $R_6$ are independently hydrogen, an alkyl group, a haloalkyl group, a cycloalkyl group, a heterocycloalkyl group, an alkenyl group, a halo alkenyl group, or an aromatic group; $R_7$ and $R_8$ are independently hydrogen or an alkyl group wherein at least one of $R_7$ or $R_8$ is hydrogen; y is 2-7 and n is 1-100.

Ring opening agents are well known in the literature. Non-limiting examples of anionic ring opening agents include alkyl lithium, an alkoxide, trialkylsiloxylithium wherein the alkyl group may or may not contain halo atoms.

Linking groups can be any divalent radical or moiety and include substituted or unsubstituted alkyl, alkyl ether, alkenyls, alkenyl ethers, halo alkyls, substituted or unsubstituted siloxanes, and monomers capable of propagating ring opening.

Ethylenically unsaturated polymerizable groups are well known to those skilled in the art. Non-limiting examples of ethylenically unsaturated polymerizable groups would include acrylates, methacrylates, vinyl carbonates, O-vinyl carbamates, N-vinyl carbamates, acrylamides and methacrylamides.

In an illustrative embodiment, as may be combined with one or more of the preceding paragraphs, the one or more contact lens-forming silicone comonomers can include, as a class of representative contact lens-forming silicone comonomers, one or more monomers of Formula X:

(X)

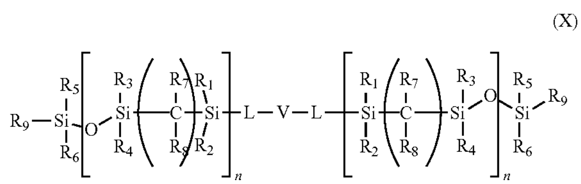

wherein L is the same or different and is a linking group or a bond; V is the same or different and is an ethylenically unsaturated polymerizable group; $R_1$, $R_2$, $R_3$, $R_4$, $R_5$, $R_6$ and $R_9$ are independently hydrogen, an alkyl group, a haloalkyl group, a cycloalkyl group, a heterocycloalkyl group, an alkenyl group, a halo alkenyl group, or an aromatic group; $R_7$ and $R_8$ are independently hydrogen or an alkyl group wherein at least one of $R_7$ or $R_8$ is hydrogen; y is 2-7 and n is 1-100.

In an illustrative embodiment, as may be combined with one or more of the preceding paragraphs, the one or more contact lens-forming silicone comonomers can include, as a class of representative contact lens-forming silicone comonomers, one or more monomers of Formulae XI and XII:

(XI)

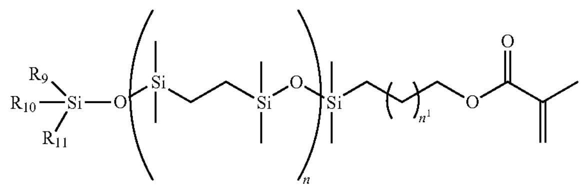

wherein $R_9$, $R_{10}$ and $R_{11}$ are independently hydrogen, an alkyl group, a haloalkyl group or other substituted alkyl groups; n is as defined above and $n^1$ is 0-10; and, (XII)

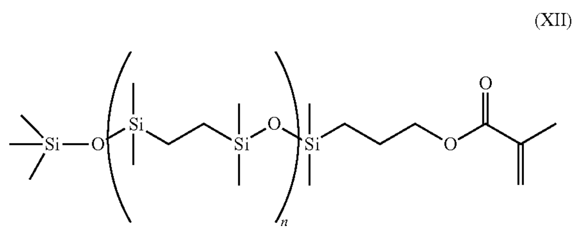

wherein n is 1 to 100, or n is 2 to 80, or n is 3 to 20, or n is 5 to 15.

In an illustrative embodiment, as may be combined with one or more of the preceding paragraphs, the one or more contact lens-forming silicone comonomers can include, as a class of representative contact lens-forming silicone comonomers, one or more monomers of Formulas XIII-XVII:

(XIII)

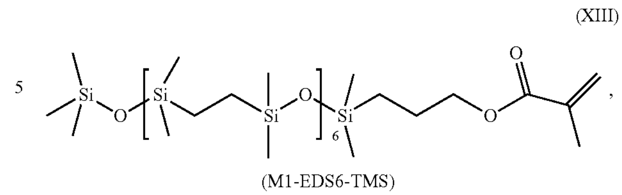

, (M1-EDS6-TMS)

(XIV)

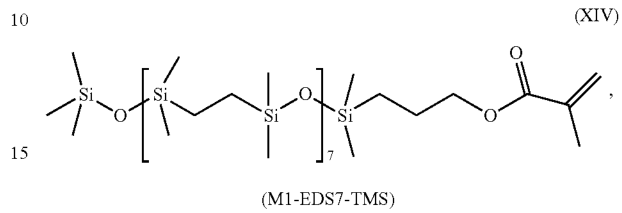

, (M1-EDS7-TMS)

(XV)

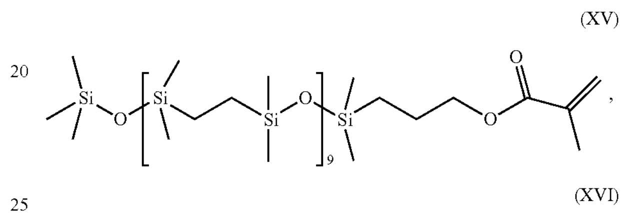

, (XVI)

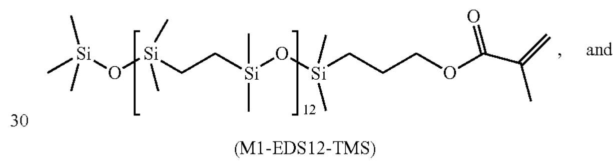

, and (M1-EDS12-TMS)

(XVII)

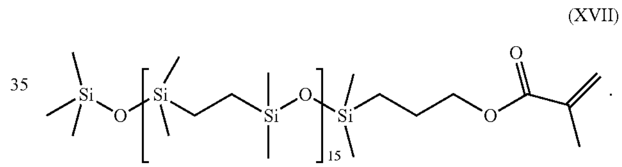

.

In an illustrative embodiment, as may be combined with one or more of the preceding paragraphs, the one or more contact lens-forming silicone comonomers can include, as a class of representative contact lens-forming silicone comonomers, one or more monomers of Formulas XVIII-XX:

(XVIII)

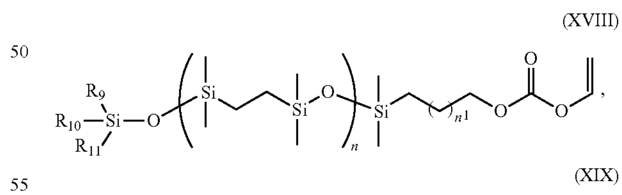

, (XIX)

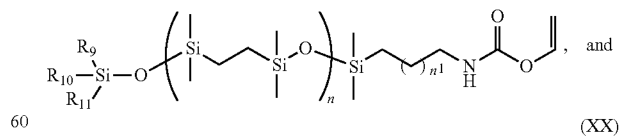

, and (XX)

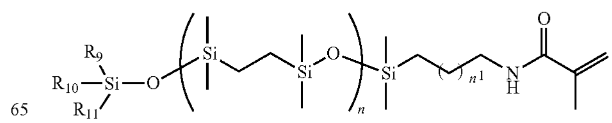

wherein $R_9$, $R_{10}$ and $R_{11}$ are independently hydrogen, an alkyl group, a haloalkyl group or other substituted alkyl groups and n and $n^1$ are as defined above.

In an illustrative embodiment, as may be combined with one or more of the preceding paragraphs, the one or more contact lens-forming silicone comonomers can include, as a class of representative contact lens-forming silicone comonomers, one or more monomers of Formulas XXI-XXIII:

(XXI)

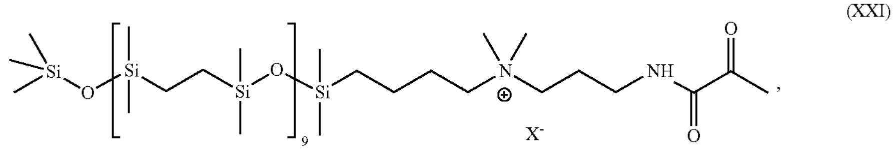

(XXII)

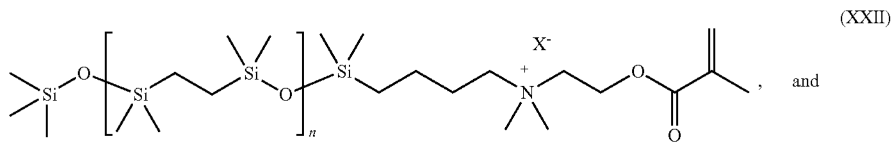

and (XXIII)

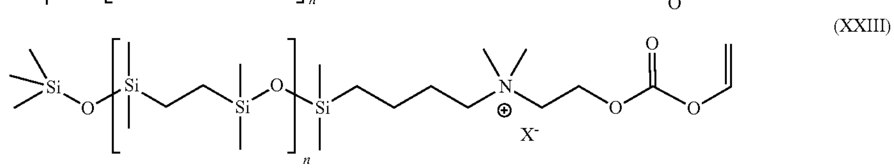

wherein n is as defined above and $X^-$ is a counterion to provide an overall neutral charge.

Counterions capable of providing an overall neutral charge are well known to those of ordinary skill in the art and would include, for example, halide ions.

In an illustrative embodiment, as may be combined with one or more of the preceding paragraphs, the one or more contact lens-forming silicone comonomers can include, as a class of representative contact lens-forming silicone comonomers, one or more monomers of Formula XXIV:

(XXIV)

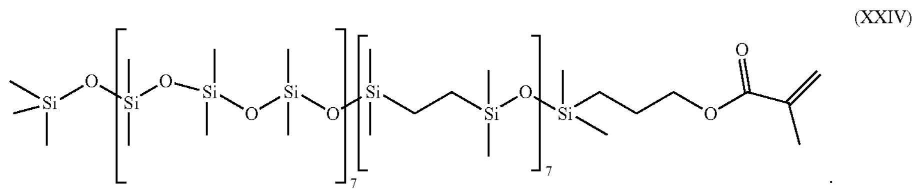

In an illustrative embodiment, as may be combined with one or more of the preceding paragraphs, the one or more contact lens-forming silicone comonomers can include, as a class of representative contact lens-forming silicone comonomers, one or more polysiloxane prepolymer represented by a structure of Formula XXV:

(XXV)

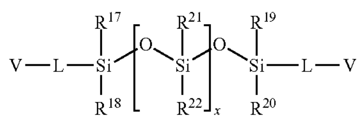

wherein each V is an independently reactive functional end group and includes, by way of example, a hydroxyl-containing reactive functional end group, and an amine-containing reactive functional end group, $R^{17}$ to $R^{22}$ are independently straight or branched, substituted or unsubstituted $C_1$-$C_{30}$ alkyl group, a substituted or unsubstituted $C_3$-$C_{30}$ cycloalkyl group, a substituted or unsubstituted $C_4$-$C_{30}$ cycloalkylalkyl group, a substituted or unsubstituted $C_3$-$C_{30}$ cycloalkenyl group, a substituted or unsubstituted $C_6$-$C_{30}$ aryl group, and a substituted or unsubstituted $C_7$-$C_{30}$ arylalkyl group, and L is independently a linking group.

In an illustrative embodiment, a hydroxyl-containing reactive functional end groups for use herein can be a group of the general formula —OH· representative examples of amine-containing reactive functional end groups for use herein include, by way of example, a (meth)acrylamide-containing reactive functional end group.

Linking group L is independently a straight or branched alkyl group, cycloalkyl group, an aryl group, an ether or polyether group, and an ester group as defined herein.

In an illustrative embodiment, a representative example of a polysiloxane prepolymer is as follows:

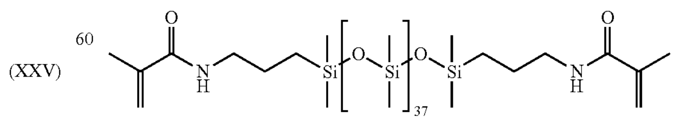

Methods for making the polysiloxane prepolymers described herein are well known and within the purview of one skilled in the art. In addition, the polysiloxane prepolymers are also commercially available from such sources as, for example, Gelest, Silar, Shin-Etsu, Momentive and Siltech.

Another class of representative contact lens-forming silicone comonomers includes, for example, fluorinated monomers. Such monomers have been used in the formation of fluorosilicone hydrogels to reduce the accumulation of deposits on contact lenses made therefrom, as disclosed in, for example, U.S. Pat. Nos. 4,954,587; 5,010,141 and 5,079,319. Also, the use of silicone-containing monomers having certain fluorinated side groups, i.e., —$(CF_2)$—H, have been found to improve compatibility between the hydrophilic and silicone-containing monomeric units. See, e.g., U.S. Pat. Nos. 5,321,108 and 5,387,662.

The above silicone materials are merely exemplary, and other materials for use as substrates that can benefit by having a UV blocker according to the illustrative embodiments and have been disclosed in various publications and are being continuously developed for use in contact lenses and other medical devices can also be used. For example, a contact lens can be formed from at least a cationic monomer such as cationic silicone-containing monomer or cationic fluorinated silicone-containing monomers.

In accordance with one or more additional non-limiting illustrative embodiments, as may be combined with one or more of the preceding paragraphs, the one or more contact lens-forming silicone comonomers can be present in the monomeric mixture in an amount ranging from about 10 wt. % to about 90 wt. %, based on the total weight of the monomeric mixture. In another illustrative embodiment, the one or more contact lens-forming silicone comonomers can be present in the monomeric mixture in an amount ranging from about 30 wt. % to about 70 wt. %, based on the total weight of the monomeric mixture.

In an illustrative embodiment, as may be combined with one or more of the preceding paragraphs, the monomeric mixture further contains, in addition to the one or more contact lens-forming comonomers, one or more UV blockers comprising a phenolic group having a protected hydroxyl moiety and one or more ethylenically unsaturated reactive groups. In a non-limiting illustrative embodiment, the one or more UV blockers comprising a phenolic group having a protected hydroxyl moiety and one or more ethylenically unsaturated reactive groups can be represented by a benzotriazole compound having a structure of Formula XXVI (XXVI)

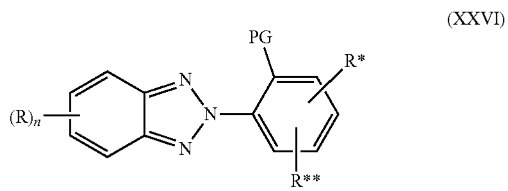

wherein each R is independently hydrogen, a halogen, an —O— group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

As used herein, recitations of "substituted" group, means a group such as an alkyl group, cycloalkyl group, heterocycloalkyl group, aryl group, and/or heteroaryl group, in which at least one hydrogen atom thereof has been optionally replaced or substituted with a group that is other than hydrogen, such as, for example, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (e.g., alkyl; alkenyl; alkynyl; cycloalkyl, including poly-fused-ring cycloalkyl and polycyclocalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups.

As used herein, recitations of "linear or branched" groups, such as linear or branched alkyl, are herein understood to include, for example, groups that are linear, such as linear $C_2$ to $C_{30}$ alkyl groups; and groups that are appropriately branched, such as branched $C_3$ to $C_{30}$ alkyl groups.

Representative examples of halogen groups include, by way of example, Cl, I, F, and Br.

Representative examples of hydrocarbyl groups include linear or branched alkyl groups, linear or branched alkenyl groups, linear or branched alkynyl groups, cycloalkyl groups, heterocycloalkyl groups, aryl groups (including polycyclic aryl groups), heteroaryl groups (having at least one hetero atom in the aromatic ring); and aralkyl groups as defined herein.

Representative examples of alkoxy groups for use herein include, by way of example, an alkyl group as defined herein attached via oxygen linkage to the rest of the molecule, i.e., of the general formula —$OR^1$, wherein $R^1$ is an alkyl, cycloalkyl, or aromatic group as defined herein, e.g., —$OCH_3$, —$OC_2H_5$, or —$OC_6H_5$ which may be substituted or unsubstituted, and the like.

Representative examples of alkyl groups for use herein include, by way of example, a linear or branched hydrocarbon chain radical containing carbon and hydrogen atoms of from 1 to about 30 carbon atoms or from 1 to 12 carbon atoms or from 1 to 6 carbon atoms with or without unsaturation, to the rest of the molecule, e.g., methyl, ethyl, n-propyl, 1-methylethyl (isopropyl), n-butyl, n-pentyl, etc., and the like.

Representative examples of alkenyl groups for use herein include, by way of example, a straight or branched hydrocarbon chain radical containing from about 3 to about 30 carbon atoms with at least one carbon-carbon double bond such as, for example, propenyl, butenyl, pentenyl and the like.

Representative examples of alkynyl groups for use herein include, by way of example, a straight or branched hydrocarbon chain radical containing from about 3 to about 30 carbon atoms with at least one carbon-carbon triple bond such as, for example, propynyl, butynyl, pentynyl and the like.

Representative examples of cycloalkyl groups for use herein include, by way of example, a substituted or unsubstituted non-aromatic mono or multicyclic ring system of about 3 to about 30 carbon atoms or from 3 to 12 carbon atoms or from 3 to 6 carbon atoms such as, for example, cyclopropyl, cyclobutyl, cyclopentyl, cyclohexyl, perhydronapththyl, adamantyl and norbornyl groups bridged cyclic group or sprirobicyclic groups, e.g., sprio-(4, 4)-non-2-yl and the like, optionally containing one or more heteroatoms, e.g., O and N, and the like.

Representative examples of heterocyclic groups for use herein include, by way of example, a substituted or unsubstituted stable 3 to about 15 membered ring radical, containing carbon atoms and from one to five heteroatoms, e.g., nitrogen, phosphorus, oxygen, sulfur and mixtures thereof. Suitable heterocyclic ring radicals for use herein may be a monocyclic, bicyclic or tricyclic ring system, which may include fused, bridged or spiro ring systems, and the nitrogen, phosphorus, carbon, oxygen or sulfur atoms in the heterocyclic ring radical may be optionally oxidized to various oxidation states. Examples of such heterocyclic groups include, but are not limited to, azetidinyl, acridinyl, benzodioxolyl, benzodioxanyl, benzofurnyl, carbazolyl, cinnolinyl, dioxolanyl, indolizinyl, naphthyridinyl, perhydroazepinyl, phenazinyl, phenothiazinyl, phenoxazinyl, phthalazinyl, pyridyl, pteridinyl, purinyl, quinazolinyl, quinoxalinyl, quinolinyl, isoquinolinyl, tetrazoyl, imidazolyl, tetrahydroisouinolyl, piperidinyl, piperazinyl, 2-oxopiperazinyl, 2-oxopiperidinyl, 2-oxopyrrolidinyl, 2-oxoazepinyl, azepinyl, pyrrolyl, 4-piperidonyl, pyrrolidinyl, pyrazinyl, pyrimidinyl, pyridazinyl, oxazolyl, oxazolinyl, oxasolidinyl, triazolyl, indanyl, isoxazolyl, isoxasolidinyl, morpholinyl, thiazolyl, thiazolinyl, thiazolidinyl, isothiazolyl, quinuclidinyl, isothiazolidinyl, indolyl, isoindolyl, indolinyl, isoindolinyl, octahydroindolyl, octahydroisoindolyl, quinolyl, isoquinolyl, decahydroisoquinolyl, benzimidazolyl, thiadiazolyl, benzopyranyl, benzothiazolyl, benzooxazolyl, furyl, tetrahydrofurtyl, tetrahydropyranyl, thienyl, benzothienyl, thiamorpholinyl, thiamorpholinyl sulfoxide, thiamorpholinyl sulfone, dioxaphospholanyl, oxadiazolyl, chromanyl, isochromanyl and the like and mixtures thereof.

Representative examples of aryl groups for use herein include, by way of example, a substituted or unsubstituted monoaromatic or polyaromatic radical containing from about 5 to about 30 carbon atoms or from 5 to 12 carbon atoms or from 5 to 8 carbon atoms such as, for example, phenyl, naphthyl, tetrahydronapthyl, indenyl, biphenyl and the like, optionally containing one or more heteroatoms, e.g., O and N, and the like.

Representative examples of heteroaryl groups for use herein include, by way of example, a substituted or unsubstituted stable 5 to about 30 membered monoaromatic or polyaromatic radical, containing carbon atoms and from one to five heteroatoms, e.g., nitrogen, phosphorus, oxygen, sulfur and mixtures thereof.

Representative examples of fused ring polycyclic-aryl-alkyl groups and similar terms such as, fused ring polycyclic-alkyl-aryl groups, fused ring polycyclo-aryl-alkyl groups, and fused ring polycyclo-alkyl-aryl groups means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to indenyl, 9H-flourenyl, cyclopentanaphthenyl, and indacenyl.

Representative examples of aralkyl groups as used herein, and in accordance with some embodiments, include, but are not limited to, $C_6$ to $C_{24}$ aralkyl, such as a $C_6$ to $C_{10}$ aralkyl, and means an aryl group substituted with an alkyl group.

Representative examples of amine groups for use herein include, by way of example, an amine of the general formula —$R^2NR^3R^4$ wherein $R^2$, $R^3$ and $R^4$ are independently hydrogen or a $C_1$-$C_{30}$ hydrocarbon such as, for example, alkyl groups, aromatic groups, or cycloalkyl groups as defined herein, and the like.

Representative examples of ethylenically unsaturated reactive groups for use herein include, by way of example, a (meth)acrylate-containing reactive end group, a (meth) acrylamide-containing reactive end group, an allyl-containing reactive end group, a vinyl-containing reactive end group, a vinylcarbonate-containing reactive end group, a vinylcarbamate-containing reactive end group, a styrene-containing reactive end group, an itaconate-containing reactive end group, a vinyloxy-containing reactive end group, a fumarate-containing reactive end group, a maleimide-containing reactive end group, a vinylsulfonyl reactive end group and the like. In a non-limiting illustrative embodiment, a (meth)acrylate-containing reactive end group can be represented by the structure:

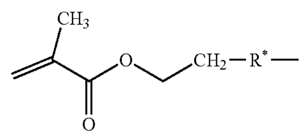

wherein R* is a linking group or bond. Suitable linking groups include, for example, a heteroatom such as O, any divalent hydrocarbon radical or moiety such as independently a straight or branched, substituted or unsubstituted $C_1$-$C_6$ alkyl group, a substituted or unsubstituted $C_3$-$C_{12}$ cycloalkyl group, a substituted or unsubstituted $C_4$-$C_{12}$ cycloalkylalkyl group, a substituted or unsubstituted $C_3$-$C_{12}$ cycloalkenyl group, a substituted or unsubstituted $C_6$-$C_{12}$ aryl group, a substituted or unsubstituted $C_7$-$C_{12}$ arylalkyl group and substituted and unsubstituted ether-containing groups.

Representative examples of suitable protecting groups for protecting the hydroxyl moiety of the phenolic group of the UV blocker include, for example, a trialkylsilane such as trimethylsilane, triethylsilane and the like, a branched alkyloxycarbonyl such as t-butyloxycarbonyl (also known as BOC), vinyloxycarbonyl, a methoxymethyl, an ethoxycarbonyloxy, a di-t-alkyl dicarbonate such as di-t-butyl dicarbonate and the like.

In an illustrative embodiment, R and R* are each hydrogen and R** is a (meth)acrylate-containing reactive end group.

In another illustrative embodiment, as may be combined with one or more of the preceding paragraphs, R** is positioned on the aromatic ring in the para position relative to the protected OH moiety.

In non-limiting illustrative embodiments, one class of UV blockers comprising a phenolic group comprising a hydroxyl moiety and one or more ethylenically unsaturated reactive groups can be represented by a benzotriazole compound having a structure of Formula XXVII:

(XXVII)

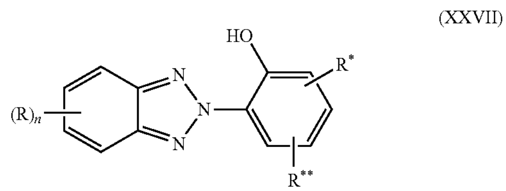

wherein R, R* and R** are as defined above.

The foregoing UV blockers for use herein are known and either commercially available from such sources as, for example, Aldrich, Polysciences, Gelest, and Melrob, or can be made by methods within the purview of one skilled in the art.

The foregoing one or more UV blockers comprising a phenolic group having a hydroxyl moiety and one or more ethylenically unsaturated reactive groups are merely illustrative and not intended to be limiting. Any known UV blockers comprising a phenolic group having a hydroxyl moiety and one or more ethylenically unsaturated reactive groups or later developed UV blockers comprising a phenolic group having a hydroxyl moiety and one or more ethylenically unsaturated reactive groups are contemplated for use herein.

In illustrative embodiments, the one or more UV blockers comprising a phenolic group having a protected hydroxyl moiety and one or more ethylenically unsaturated reactive groups can be obtained by protecting a hydroxyl moiety of the phenolic group with a suitable protecting group as discussed above. Methods for protecting the hydroxyl moiety with a protecting group are within the purview of one skilled in the art.

Representative examples of various synthetic routes to make the foregoing UV blockers comprising a phenolic group comprising a protected hydroxyl moiety and one or more ethylenically unsaturated reactive groups are as follows.

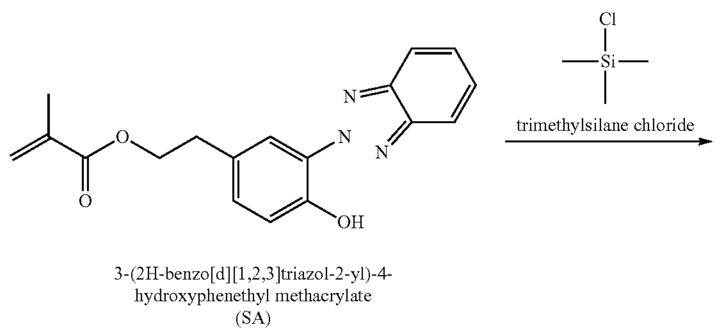

3-(2H-benzo[d][1,2,3]triazol-2-yl)-4-hydroxyphenethyl methacrylate
(SA)

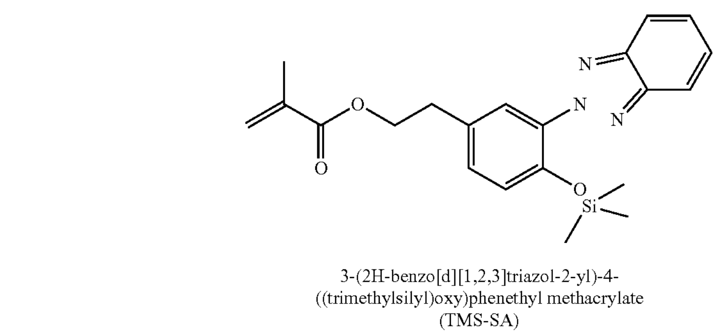

3-(2H-benzo[d][1,2,3]triazol-2-yl)-4-((trimethylsilyl)oxy)phenethyl methacrylate
(TMS-SA)

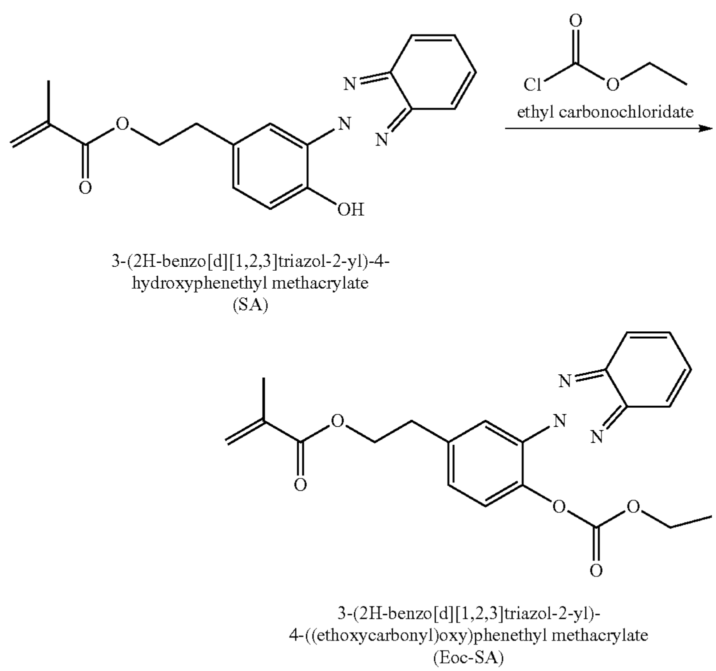

3-(2H-benzo[d][1,2,3]triazol-2-yl)-4-hydroxyphenethyl methacrylate
(SA)

3-(2H-benzo[d][1,2,3]triazol-2-yl)-4-((ethoxycarbonyl)oxy)phenethyl methacrylate
(Eoc-SA)

-continued

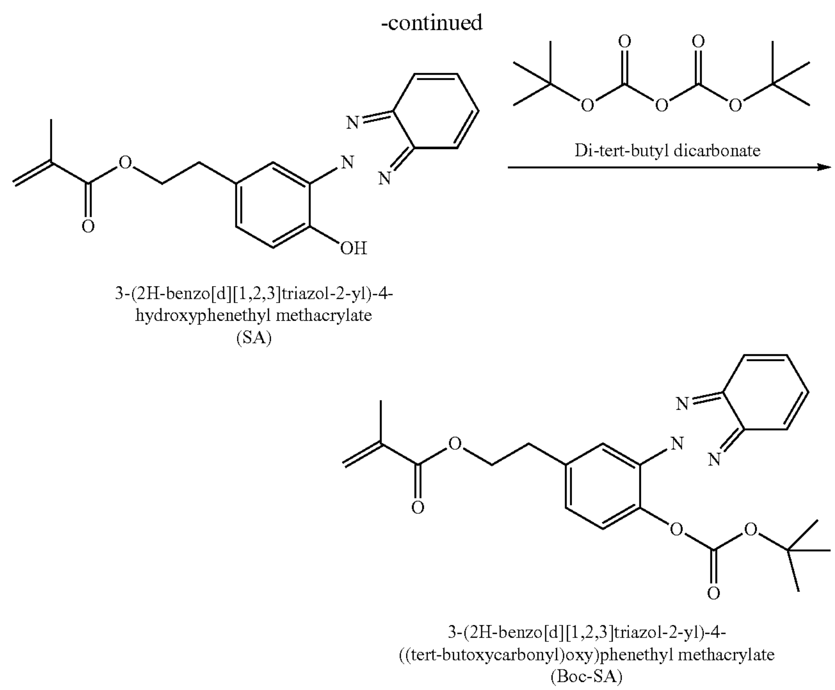

3-(2H-benzo[d][1,2,3]triazol-2-yl)-4-hydroxyphenethyl methacrylate
(SA)

3-(2H-benzo[d][1,2,3]triazol-2-yl)-4-((tert-butoxycarbonyl)oxy)phenethyl methacrylate
(Boc-SA)

In accordance with one or more additional non-limiting illustrative embodiments, as may be combined with one or more of the preceding paragraphs, the one or more UV blockers comprising a phenolic group having a protected hydroxyl moiety and one or more ethylenically unsaturated reactive groups can be present in the monomeric mixture in an amount ranging from about 0.1 wt. % to about 5 wt. %, based on the total weight of the monomeric mixture. In another illustrative embodiment, the one or more UV blockers comprising a phenolic group having a protected hydroxyl moiety and one or more ethylenically unsaturated reactive groups can be present in the monomeric mixture in an amount ranging from about 0.5 wt. % to about 3 wt. %, based on the total weight of the monomeric mixture.

In an illustrative embodiment, as may be combined with one or more of the preceding paragraphs, the monomeric mixture further contains, in addition to the one or more contact lens-forming comonomers and one or more UV blockers comprising a phenolic group having a protected hydroxyl moiety and one or more ethylenically unsaturated reactive groups, one or more blue light blockers comprising a phenolic group having a protected hydroxyl moiety and one or more ethylenically unsaturated reactive groups. In an illustrative embodiment, the one or more blue light blockers comprising a phenolic group comprising a protected hydroxyl moiety and one or more ethylenically unsaturated reactive groups can be represented by an acridone compound having a structure of Formula XXVIII:

(XXVIII)

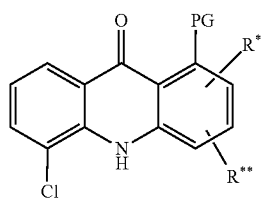

wherein R* is hydrogen or a substituted or unsubstituted hydrocarbyl group as defined above, R** is an ethylenically unsaturated reactive group as defined above and wherein PG is a protected hydroxyl moiety as defined above.

In an illustrative embodiment, R* is hydrogen and R** is a (meth)acrylate-containing reactive end group as defined above.

In another illustrative embodiment, as may be combined with one or more of the preceding paragraphs, R** is positioned on the aromatic ring in the para position relative to the OH moiety.

In non-limiting illustrative embodiments, a class of blue light blockers comprising a phenolic group comprising a hydroxyl moiety and one or more ethylenically unsaturated reactive groups can be represented by an acridone compound having a structure of Formula XXIX:

(XXIX)

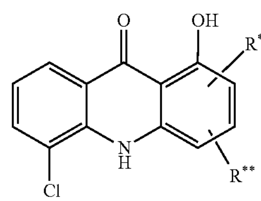

wherein R* and R** are as defined above.

The foregoing blue light blockers for use herein are known and either commercially available from such sources as, for example, Vishwa-Syntharo PharmaCompany, or can be made by methods within the purview of one skilled in the art.

The foregoing one or more blue light blockers comprising a phenolic group having a hydroxyl moiety and one or more ethylenically unsaturated reactive groups are merely illustrative and not intended to be limiting. Any known blue light blockers comprising a phenolic group having a hydroxyl moiety and one or more ethylenically unsaturated reactive groups or later developed blue light blockers comprising a phenolic group having a hydroxyl moiety and one or more ethylenically unsaturated reactive groups are contemplated for use herein.

In an illustrative embodiment, the one or more blue light blockers can be obtained by protecting a hydroxyl moiety of the phenolic group with a suitable protecting group as discussed above. Representative examples of various synthetic routes to make the foregoing blue light blockers comprising a phenolic group comprising a protected hydroxyl moiety and one or more ethylenically unsaturated reactive groups are as follows.

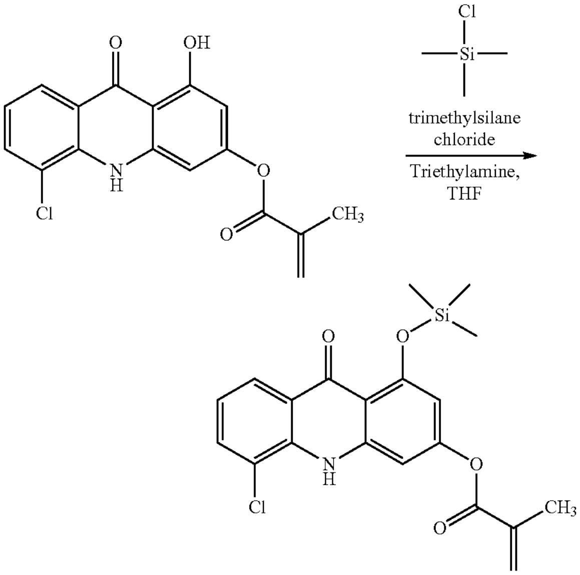

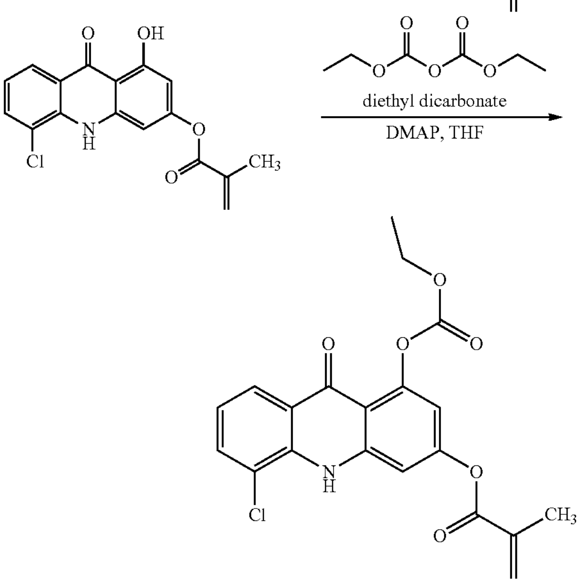

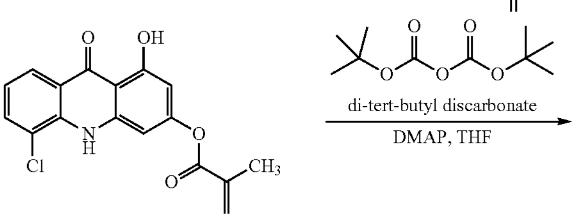

-continued

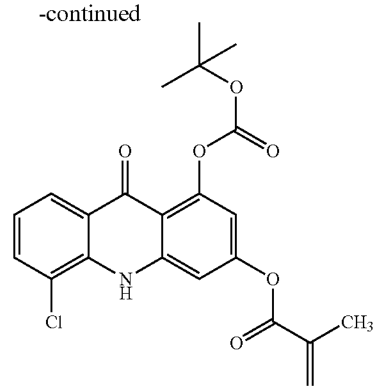

In accordance with one or more additional non-limiting illustrative embodiments, as may be combined with one or more of the preceding paragraphs, the one or more blue light blockers can be present in the monomeric mixture in an amount ranging from about 0.1 wt. % to about 2 wt. %, based on the total weight of the monomeric mixture.

In non-limiting illustrative embodiments, as may be combined with one or more of the preceding paragraphs, the monomeric mixture can further contain one or more crosslinking agents. Suitable crosslinking agents for use herein are known in the art. For example, in non-limiting illustrative embodiments, suitable one or more cross-linking agents include one or more crosslinking agents containing at least two ethylenically unsaturated reactive end groups. In one embodiment, the ethylenically unsaturated reactive end groups are (meth)acrylate-containing reactive end groups. In another embodiment, the ethylenically unsaturated reactive end groups are non-(meth)acrylate reactive end groups. In one embodiment, the ethylenically unsaturated reactive end groups are a combination of one or more (meth)acrylate-containing reactive end groups and one or more non-(meth) acrylate reactive end groups.

In an illustrative embodiment, useful one or more crosslinking agents containing at least two ethylenically unsaturated reactive end groups include, for example, one or more di-, tri- or tetra(meth)acrylate-containing crosslinking agents. In an illustrative embodiment, useful one or more di-, tri- or tetra(meth)acrylate-containing crosslinking agents include, for example, alkanepolyol di-, tri- or tetra (meth)acrylate-containing crosslinking agents such as, for example, one or more alkylene glycol di(meth)acrylate crosslinking agents, one or more alkylene glycol tri(meth) acrylate crosslinking agents, one or more alkylene glycol tetra(meth)acrylate crosslinking agents, one or more alkanediol di(meth)acrylate crosslinking agents, alkanediol tri (meth)acrylate crosslinking agents, alkanediol tetra(meth) acrylate crosslinking agents, one or more alkanetriol di(meth)acrylate crosslinking agents, alkanetriol tri(meth) acrylate crosslinking agents, alkanetriol tetra(meth)acrylate crosslinking agents, one or more alkanetetraol di(meth) acrylate crosslinking agents, alkanetetraol tri(meth)acrylate crosslinking agents, alkanetetraol tetra(meth)acrylate crosslinking agents and the like and mixtures thereof.

In an illustrative embodiment, one or more alkylene glycol di(meth)acrylate crosslinking agents include tetraethylene glycol dimethacrylate, ethylene glycol di(meth)acrylates having up to about 10 ethylene glycol repeating units, butyleneglycol di(meth)acrylate and the like. In one embodiment, one or more alkanediol di(meth)acrylate crosslinking agents include butanediol di(meth)acrylate crosslinking agents, hexanediol di(meth)acrylate and the like. In one embodiment, one or more alkanetriol tri(meth)acrylate crosslinking agents are trimethylol propane trimethacrylate crosslinking agents. In one embodiment, one or more alkanetetraol tetra(meth)acrylate crosslinking agents are pentaerythritol tetramethacrylate crosslinking agents.

In a non-limiting illustrative embodiment, suitable crosslinking agents include, for example, ethylene glycol diacrylate, diethylene glycol diacrylate, allyl acrylate, 1,3-propanediol diacrylate, 2,3-propanediol diacrylate, 1,6-hexanediol diacrylate, 1,4-butanediol diacrylate, triethylene glycol diacrylate, cyclohexane-1,1-diyldimethanol diacrylate, 1,4-cyclohexanediol diacrylate, 1,3-adamantanediol diacrylate, 1,3-adamantanedimethyl diacrylate, 2,2-diethyl-1,3-propanediol diacrylate, 2,2-diisobutyl-1,3-propanediol diacrylate, 1,3-cyclohexanedimethyl diacrylate, 1,4-cyclohexanedimethyl diacrylate; neopentyl glycol diacrylate, tetraethyleneglycol diacrylate, polyethyleneglycol diacrylate; and their corresponding methacrylates.

In a non-limiting illustrative embodiment, suitable crosslinking agents include, for example, 1,4-butanediol diacrylate, 1,4-butanediol dimethacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, 1,3-propanediol diacrylate, 1,3-propanediol dimethacrylate, 1,6-hexanediol diacrylate, 1,6-hexanediol dimethacrylate, poly(ethylene glycol) diacrylate (Mn=700 Daltons), poly(ethylene glycol) dimethacrylate (Mn=700 Daltons), and poly(ethylene glycol) dimethacrylate (Mn=1000 Daltons).

In one embodiment, the one or more crosslinking agents containing at least two ethylenically unsaturated reactive end groups include at least one allyl-containing reactive end group and at least one (meth)acrylate-containing reactive end group. In an illustrative embodiment, the one or more crosslinking agents can be allyl methacrylate.

In non-limiting illustrative embodiments, as may be combined with one or more of the preceding paragraphs, the one or more crosslinking agents can be present in the monomeric mixture in a contact lens-forming amount. In non-limiting illustrative embodiments, as may be combined with one or more of the preceding paragraphs, the one or more crosslinking agents are present in the monomeric mixture in an amount of about 2 to about 30 wt. %, based on the total weight of the monomeric mixture. In non-limiting illustrative embodiments, as may be combined with one or more of the preceding paragraphs, the one or more crosslinking agents are present in the monomeric mixture in an amount of about 5 to about 20 wt. %, based on the total weight of the monomeric mixture.

In non-limiting illustrative embodiments, as may be combined with one or more of the preceding paragraphs, the monomeric mixture can further contain a diluent. Suitable diluents include, for example, at least one or more boric acid esters of a $C_1$ to $C_8$ monohydric alcohol, water-soluble or partly water-soluble monohydric alcohols and mixtures thereof. In one embodiment, a diluent includes, for example, at least one or more boric acid esters of a $C_1$ to $C_5$ monohydric alcohol. Suitable boric acid esters of a $C_1$ to $C_8$ monohydric alcohol include, for example, trimethyl borate, triethyl borate, tri-n-propyl borate, triisopropyl borate, tri-n-butyl borate, and tri-tert-butyl borate. Suitable water-soluble or partly water-soluble monohydric alcohols include, for example, monohydric alcohols having from 1 to 5 carbon atoms such as methanol, ethanol, isopropyl alcohol, 1-propanol, t-butyl alcohol, 2-butyl alcohol, 2-methyl-1-propanol, t-amyl alcohol and other $C_5$ isomers.

In non-limiting illustrative embodiments, as may be combined with one or more of the preceding paragraphs, the monomeric mixture contains about 5 wt. % to about 50 wt. % of the diluent, based on the total weight of the monomeric mixture. In one embodiment, the monomeric mixture contains about 15 wt. % to about 30 wt. % of the diluent, based on the total weight of the monomeric mixture.

The monomeric mixture may further contain, as necessary and within limits not to impair the purpose and effect of the illustrative embodiments, various additives such as an antioxidant, coloring agent, lubricant, internal wetting agent, toughening agent and the like and other constituents as are well known in the art.

The contact lenses according to the non-limiting illustrative embodiments described herein can be manufactured employing various conventional techniques, to yield a shaped article having the desired posterior and anterior lens surfaces. Various processes are known for curing a monomeric mixture in the production of contact lenses including, by way of example, spincasting and static casting. For example, spincasting methods involve charging the monomer mixture in an open-faced mold having a concave bottom surface, i.e., a one-piece mold, and spinning the mold in a controlled manner while exposing the monomer mixture to UV curing conditions such as UV light. Static casting methods involve charging the monomer mixture between two mold sections, one mold section shaped to form the anterior lens surface and the other mold section shaped to form the posterior lens surface, and curing the monomer mixture while retained in the mold assembly to form a lens, for example, by UV free radical polymerization of the mixture. Spincasting methods are disclosed in U.S. Pat. Nos. 3,408,429 and 3,660,545, and static casting methods are disclosed in U.S. Pat. Nos. 4,113,224, 4,197,266, and 5,271,875. Additionally, the monomer mixtures may be cast in the shape of rods or buttons, which are then lathe cut into a desired lens shape.

Polymerization of the monomer mixture is facilitated by exposing the mixture to UV curing conditions such as UV radiation. A polymerization initiator may be included in the mixture to facilitate the polymerization step. Representative examples of UV initiators are those known in the art and include, but are not limited to, benzoin methyl ether, benzoin ethyl ether, Darocure 1173, 1164, 2273, 1116, 2959, 3331 (EM Industries) and Irgacure 184, 651 and 819 (BASF), and the like, Darocure TPO (BASF), Lucirin TPO, Lucirin TPO-L (BASF), etc. Generally, the UV initiator will be employed in the mixture at a concentration of about 0.01 to about 5 percent by weight of the total monomer mixture.

Generally, polymerization under UV curing polymerization conditions can be carried out for about 5 minutes to about 50 minutes and under an inert atmosphere of, for example, nitrogen or argon.

Following casting, the polymerization product (contact lens) is dry released from the mold. For example, the polymerization product can be dry released by simply removing the polymerization product from the mold in a dry state. In another embodiment, dry release is accomplished by way of mechanical actions in which the polymerization product is removed mechanically from the molds using mechanical grippers such as tweezers, taking a precaution of not to tear the polymerization product. In the event that mechanical removal cannot be carried out, the mold half containing the polymerization product is mechanically deformed to forcibly dry release it.

Next, the protected hydroxyl moiety of the phenolic group of the UV blocker and blue light blocker, if used, is deprotected. In non-limiting illustrative embodiments, the protected hydroxyl moiety of the phenolic group is fully deprotected. In non-limiting illustrative embodiments, the protected hydroxyl moiety of the phenolic group can be deprotected through an extraction and/or autoclaving process when the contact lens is immersed in an aqueous packaging solution and placed in a packaging system as discussed below.

In one illustrative embodiment to deprotect the protected hydroxyl moiety of the phenolic group of the UV blocker and optional blue light blocker, once the contact lens is dry released it is subjected to an extraction process in which the contact lens is soaked in a series of solutions. In non-limiting illustrative embodiments, the contact lens is first soaked in a first solvent solution including, for example, a low molecular weight alcohol solvent, an aliphatic hydrocarbon solvent, a cycloaliphatic hydrocarbon solvent, a ketone solvent, a nitrile solvent, an ether solvent, an amido group-containing solvent and mixtures thereof. Suitable low molecular weight alcohols include, for example, low molecular weight alcohols having about 1 to about 13 carbon atoms and/or a molecular weight of no greater than about 200. A suitable low molecular alcohol can be selected from a variety of low-molecular-weight monohydric alcohols, each comprising about 1 to about 13 carbon atoms. Suitable monohydric alcohols include, for example, methanol, ethanol, propanol, isopropyl alcohol, butanol, isobutyl alcohol, tert-butyl alcohol, hexanol, 2-ethylhexanol, dodecanol, and the like. Suitable aliphatic or cycloaliphatic hydrocarbon solvents include, for example, pentane, hexane, heptane, cyclohexane and the like.

Suitable ketone solvents include, for example, acetone, methyl ethyl ketone, diethyl ketone, methyl propyl ketone, methyl isopropyl ketone, ethyl propyl ketone, ethyl isopropyl ketone, dipropyl ketone, diisopropyl ketone, methyl butyl ketone, methyl isobutyl ketone, methyl sec butyl ketone, methyl tert-butyl ketone, ethyl butyl ketone, ethyl isobutyl ketone, ethyl sec-butyl ketone, ethyl tert-butyl ketone, propyl butyl ketone, isopropyl butyl ketone, propyl isobutyl ketone, propyl sec-butyl ketone, propyl tert butyl ketone, isopropyl isobutyl ketone, isopropyl sec-butyl ketone, isopropyl tert-butyl ketone, dibutyl ketone, diisobutyl ketone, di-sec-butyl ketone, di-tert-butyl ketone, butyl isobutyl ketone, butyl sec-butyl ketone, butyl tert-butyl ketone, isobutyl sec-butyl ketone, isobutyl tert-butyl ketone, sec-butyl tert-butyl ketone, 5-heptanone, 5-methyl-2-hexanone (methyl isoamyl ketone), 4-methyl-2-hexanone, 3-methyl-2-hexanone, 3,4-dimethyl-2-pentanone, 3,3-dimethyl-2-pentanone, 4,4-dimethyl-2-pentanone, 3-octanone, 4-methyl-3-heptanone, 5-methyl-3-heptanone, 6-methyl-3-heptanone, 4,4-dimethyl-3-hexanone, 4,5-dimethyl-3-hexanone, 5,5-dimethyl-3-hexanone, 4-nonanone, 5-methyl-4-octanone, 6-methyl-4-octanone, 7-methyl-4-octanone, 5,5-dimethyl-4-neptanone, 5,6-dimethyl-4-heptanone, 6,6-dimethyl-4-heptanone, 2-undecanone, cyclopropanone, cyclobutanone, cyclopentanone, cyclohexanone, cycloheptanone, cyclooctanone, cyclononanone, cyclodecanone, cycloundecanone, cyclododecanone and the like and combinations thereof. In one embodiment, a ketone solvent is acetone.

Suitable nitrile solvents include, for example, saturated or unsaturated aliphatic, alicyclic, or aromatic compounds containing a nitrile group. Included within the nitriles are compounds containing heteroatom such as those selected from Groups 13, 14, 15, 16 and 17 of the Periodic Table of Elements. Representative examples of nitriles for use herein include acetonitrile; propionitrile; isopropionitrile; butyronitrile; isobutyronitrile; valeronitrile; isovaleronitrile; trimethylacetonitrile; hexanenitrile; heptanenitrile; heptyl cyanide; octyl cyanide; undecanenitrile; malononitrile; succinonitrile; glutaronitrile; adiponitrile; sebaconitrile; allyl cyanide; acrylonitrile; crotononitrile; methacrylonitrile; fumaronitrile; tetracyanoethylene; cyclopentanecarbonitrile; cyclohexanecarbonitrile; dichloroacetonitrile; fluoroacetonitrile; trichloroacetonitrile; benzonitrile; benzyl cyanide; 2-methylbenzyl cyanide; 2-chlorobenzonitrile; 3-chlorobenzonitrile; 4-chlorobenzonitrile; o-tolunitrile; m-tolunitrile; p-tolunitrile and the like and mixtures thereof. In one embodiment, a a nitrile solvent is acetonitrile.

Suitable ether solvents include, for example, dialkyl ethers wherein the alkyl groups are the same or different and are from 1 to about 12 carbon atoms. Representative examples of an ether solvent include dimethylether, diethylether, di-i-propylether; dioxane, tetrahydrofuran, pyran and the like and mixtures thereof. In one embodiment, an ether solvent is tetrahydrofuran.

Suitable amido group-containing solvents include, for example, dimethyl formamide, N-methyl formanilide, N-formyl piperidine, N-formyl morpholine, dimethyl acetamide, N-methyl pyrrolidone, N,N-dimethyl benzamide and mixtures thereof. In one embodiment, an amido group-containing solvent is N-methyl pyrrolidone.

In one embodiment, the first solvent solution can further include water in combination with any of the foregoing first solvents. In another embodiment, the first solvent solution can be a blend of water in combination with a low molecular weight alcohol solvent. For example, the first solvent solution can be a blend containing from about 25 wt. % to about 75 wt. % of the first solvent solution and from about 75 wt. % to about 25 wt. % water. In another embodiment, a blend can contain from about 40 wt. % to about 60 wt. % of the first solvent solution and from about 60 wt. % to about 40 wt. % water.

The contact lens is soaked in the first solvent solution or blend of water and the first solvent solution for a time period ranging from about 5 to about 60 minutes. In one embodiment, the contact lens is soaked in the first solvent solution or blend of water and the first solvent solution for a time period ranging from about 10 to about 30 minutes.

In accordance with one or more additional non-limiting illustrative embodiments, as may be combined with one or more of the preceding paragraphs, the contact lens can then be soaked in a second solvent solution including, for example, any of the foregoing low molecular weight alcohol solvent, aliphatic hydrocarbon solvent, cycloaliphatic hydrocarbon solvent, ketone solvent, nitrile solvent, ether solvent, and amido group-containing solvents discussed hereinabove. In one embodiment, the second solvent solution is any of the low molecular weight alcohol solvents.

In accordance with one or more additional non-limiting illustrative embodiments, as may be combined with one or more of the preceding paragraphs, the contact lens can then be soaked in a third solvent solution including, for example, any of the foregoing low molecular weight alcohol solvent, aliphatic hydrocarbon solvent, cycloaliphatic hydrocarbon solvent, ketone solvent, nitrile solvent, ether solvent, and amido group-containing solvents discussed hereinabove. In one embodiment, the third solvent solution is any of the low molecular weight alcohol solvents.

In one embodiment, the third solvent solution can further include water in combination with any of the foregoing first solvents. In another embodiment, the third solvent solution can be a blend of water in combination with a low molecular weight alcohol solvent. For example, the third solvent solution can be a blend containing from about 25 wt. % to about 75 wt. % of the third solvent solution and from about 75 wt. % to about 25 wt. % water. In another embodiment, a blend can contain from about 40 wt. % to about 60 wt. % of the third solvent solution and from about 60 wt. % to about 40 wt. % water.

The contact lens is soaked in the third solvent solution or blend of water and the third solvent solution for a time period ranging from about 5 to about 60 minutes. In one embodiment, the contact lens is soaked in the third solvent solution or blend of water and the third solvent solution for a time period ranging from about 10 to about 30 minutes.

In accordance with one or more additional non-limiting illustrative embodiments, as may be combined with one or more of the preceding paragraphs, the contact lens can then be soaked in a series of water solutions. The contact lens is soaked in the water solutions for a time period ranging from about 5 to about 60 minutes. In one embodiment, the contact lens is soaked in the water solutions for a time period ranging from about 10 to about 30 minutes.

Following subjecting the contact lens to the foregoing extraction process, the extracted contact lens is sterilized. In one embodiment, the extracted contact lens is sterilized by submerging the extracted contact lens in a buffered saline, e.g., a borate buffered saline or phosphate buffered saline, and then subjecting it to autoclave conditions at temperatures of about 120° C. or higher for at least about 5 minutes, or at least about 20 minutes or at least 24 hours or up to about 72 hours. The sterilized contact lens is then rinsed with water and positioned in its packaging with a suitable buffered saline. The package is sealed and again the contact lens is subjected to autoclave conditions of the sealed container at temperatures of about 120° C. or higher.

In another illustrative embodiment to deprotect the protected hydroxyl moiety of the phenolic group of the UV blocker and optional blue light blocker, once the contact lens is dry released it is placed in a container that includes a receptacle portion to hold the contact lens and a sterile aqueous packaging solution. Examples of the container are conventional biomedical device blister packages. This receptacle, containing the contact lens immersed in the aqueous packaging solution, is hermetically sealed, for example, by sealing lidstock on the package over the receptacle. For example, the lidstock is sealed around a perimeter of the receptacle. The aqueous packaging solution and the contact lens are sterilized while sealed in the package receptacle by autoclaving the package at a temperature of at least 100° C., or at least 120° C. Following autoclaving, the protected hydroxyl moiety of the phenolic group of the UV blocker and blue light blocker, if used, is deprotected.

In non-limiting illustrative embodiments, the resulting contact lens demonstrates sufficient blocking of UV to meet at least FDA Class I specifications for UV blocking. In other non-limiting illustrative embodiments, the resulting contact lens demonstrates sufficient blocking of UV to meet at least FDA Class II specifications for UV blocking and the protected hydroxyl moiety of the phenolic group of the UV blocker is fully deprotected.

The following examples are provided to enable one skilled in the art to practice the invention and are merely illustrative of the invention. The examples should not be read as limiting the scope of the invention as defined in the claims.

In the examples, the following abbreviations are used.

TRIS: Tris(trimethylsiloxy)silylpropyl methacrylate.

NVP: N-vinyl-2-pyrrolidone.

EGDMA: Ethylene glycol dimethacrylate.

HEMA: 2-hydroxyethyl methacrylate.

DMA: N,N-dimethylacrylamide.

IMVT: 1,4-bis(4-(2-methacryloxyethyl)phenylamino)anthraquinone.

Irgacure 819: a photoinitiator for free radical polymerization available from Sigma Aldrich.

UV416: 2-(4-Benzoyl-3-hydroxyphenoxy)ethyl acrylate.

SA monomer: A compound having the structure:

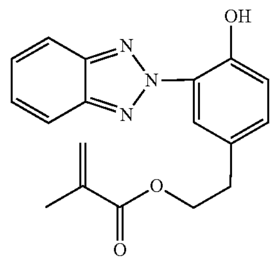

Ma2D37: a compound having the following structure and available from Shin-Etsu and Gelest:

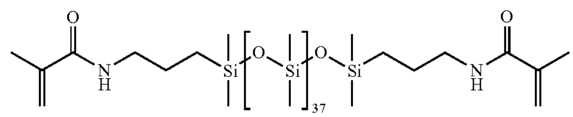

M1EDS6: a compound having the following structure and available from Gelest:

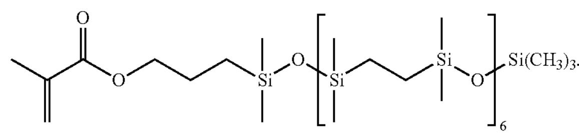

Various polymerization products were formed as discussed below and characterized by standard testing procedures such as:

Contact Angle (CBCA): Captive bubble contact angle data was collected on a First Ten Angstroms FTA-1000 prop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70-72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high-speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

UVA Transmittance % and UVB Transmittance %: The transmittance was measured with JASCO V-760 with attachment of JASCO PIV-756. A sample holder of quartz cell was filled with phosphate buffer solution. The contact lens sample was placed in the center of the holder. The transmittance % through the sample was conducted in the wavelength range of 200-800 nm. UVA Transmittance % is the integration value of transmittance % in the range of 316-380 nm. UVB Transmittance % is the integration value of transmittance % in the range of 280-315 nm.

Example 1

Synthesis of 3-(2H-benzo[d][1,2,3]triazol-2-yl)-4-((trimethylsilyl)oxy)phenethyl methacrylate (TMS-SA) by the General Reaction Scheme

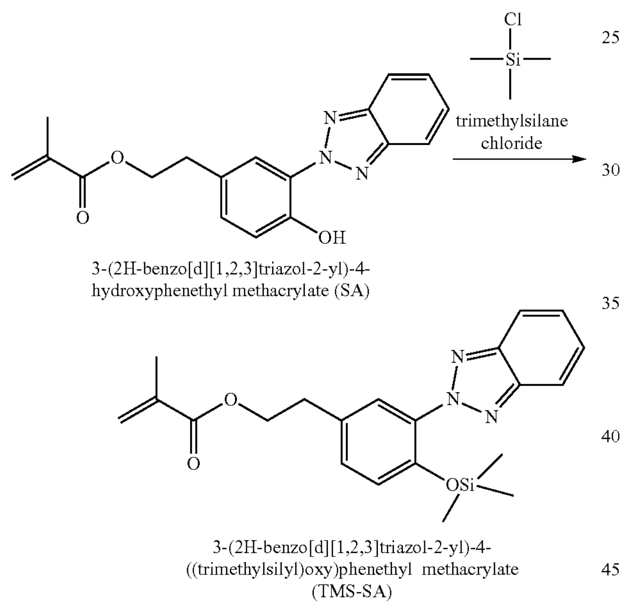

3-(2H-benzo[d][1,2,3]triazol-2-yl)-4-hydroxyphenethyl methacrylate (SA)

3-(2H-benzo[d][1,2,3]triazol-2-yl)-4-((trimethylsilyl)oxy)phenethyl methacrylate (TMS-SA)

A 250-mL round bottom flask equipped with a magnetic stirrer was dried in a heat oven overnight and cooled to room temperature. 2-[3-(2H-Benzotriazol-2-yl)-4-hydroxyphenyl]ethyl methacrylate (5 g, 15.5 mmol, 1 equiv.) and triethylamine (1.88 g, 18.5 mmol, 1.2 equiv.) were added into the flask with a septum. Next, anhydrous THF (45 mL) was injected into the flask with a syringe. The flask was then cooled in a 0° C. ice bath. Trimethylchlorosilane (2.01 g, 18.6 mmol, 1.2 equiv.) was injected into the flask slowly, and the reaction was stirred overnight. The solvent was removed from rotovap and the solid was dissolved in anhydrous diethyl ether. The solution was passed through a celite plug to remove triethylamine hydrochloride, and then was concentrated in rotovap and dried in a vacuum oven overnight to afford 3-(2H-benzo[d][1,2,3]triazol-2-yl)-4-((trimethylsilyl)oxy)phenethyl methacrylate (4.7 g, 76%) as a light brown liquid.

$^1$H NMR (400 MHz, CHLOROFORM-d) δ ppm 0.17-0.19 (s, 9H) 2.02 (s, 3H) 3.119 (m, 2H) 4.47-4.51 (m, 2H) 5.63-5.64 (s, 1H) 6.19 (s, 1H) 7.10-7.13 (m, 1H) 7.38-7.42 (m, 1H) 7.52-7.54 (m, 2H) 7.75-7.76 (m, 1H) 8.04-8.07 (m, 2H).

Example 2

Synthesis of 3-(2H-benzo[d][1,2,3]triazol-2-yl)-4-((ethoxycarbonyl)oxy)phenethyl methacrylate (Eoc-SA) by the General Reaction Scheme

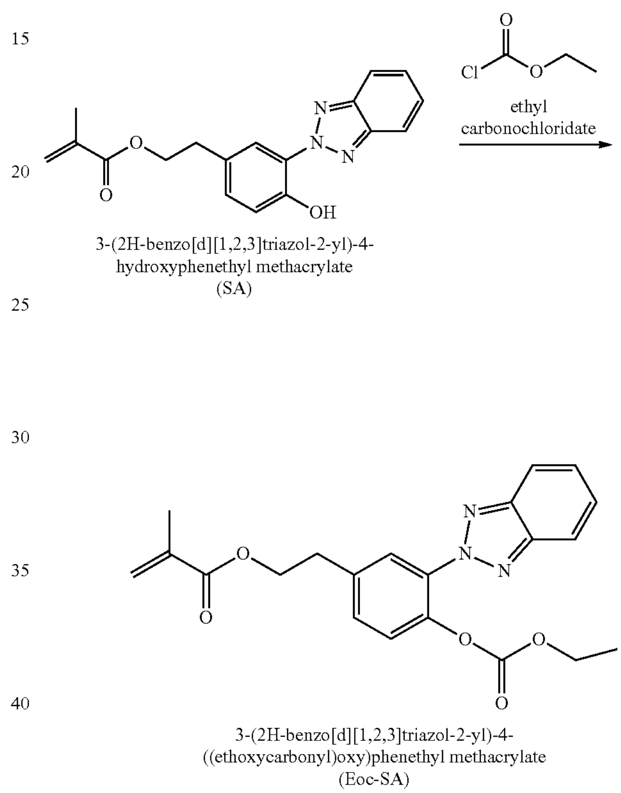

3-(2H-benzo[d][1,2,3]triazol-2-yl)-4-hydroxyphenethyl methacrylate (SA)

3-(2H-benzo[d][1,2,3]triazol-2-yl)-4-((ethoxycarbonyl)oxy)phenethyl methacrylate (Eoc-SA)

A 250-mL round bottom flask equipped with a magnetic stirrer was dried in a heat oven overnight and cooled to room temperature. 2-[3-(2H-Benzotriazol-2-yl)-4-hydroxyphenyl]ethyl methacrylate (5 g, 15.5 mmol, 1 equiv.) and triethylamine (1.88 g, 18.5 mmol, 1.2 equiv.) were added into the flask with a septum. Next, anhydrous THF (45 mL) was injected into the flask with a syringe. The flask was then cooled in a 0° C. ice bath. Ethyl chloroformate (2.01 g, 18.6 mmol, 1.2 equiv.) was injected into the flask slowly and the reaction was stirred overnight. Solvent was removed from rotovap and the solid was dissolved in anhydrous diethyl ether. The solution was passed through a celite plug to remove triethylamine hydrochloride. The product was purified with recrystallization in diethyl ether to afford 3-(2H-benzo[d][1,2,3]triazol-2-yl)-4-((ethoxycarbonyl)oxy)phenethyl methacrylate (3.9 g, 63.8 0%) as a white crystal.

$^1$H NMR (400 MHz, CHLOROFORM-d) δ ppm 1.32-1.44 (m, 3H) 1.88-1.99 (m, 3H) 3.04-3.16 (m, 2H) 4.25-4.36 (m, 2H) 4.37-4.48 (m, 2H) 5.51-5.60 (m, 1H) 6.06-6.15 (m, 1H) 7.32-7.40 (m, 2H) 7.41-7.46 (m, 2H) 7.85-7.96 (m, 2H) 8.08-8.16 (m, 1H).

Example 3

Synthesis of 3-(2H-benzo[d][1,2,3]triazol-2-yl)-4-((tert-butoxycarbonyl)oxy)phenethyl methacrylate (Boc-SA) by the General Reaction Scheme

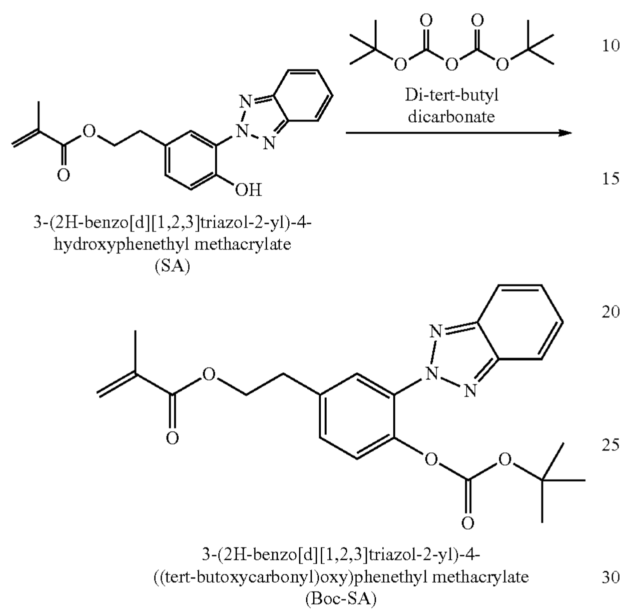

3-(2H-benzo[d][1,2,3]triazol-2-yl)-4-hydroxyphenethyl methacrylate (SA)

3-(2H-benzo[d][1,2,3]triazol-2-yl)-4-((tert-butoxycarbonyl)oxy)phenethyl methacrylate (Boc-SA)

A 250-mL round bottom flask equipped with a magnetic stirrer was dried in a heat oven overnight and cooled to room temperature. 2-[3-(2H-Benzotriazol-2-yl)-4-hydroxyphenyl]ethyl methacrylate (10 g, 30.9 mmol, 1 equiv.) and 4-Dimethylaminopyridine (378 mg, 3.1 mmol, 0.1 equiv.) were added into the flask with a septum. Next, anhydrous THF (100 mL) was injected into the flask with a syringe. Di-tert-butyl decarbonate (8.1 g, 37.1 mmol, 1.2 equiv.) was dissolved in 20 mL of anhydrous THF in a vial. The di-tert-butyl decarbonate solution was injected into the flask slowly and the reaction was stirred overnight. The reaction mixture was washed with 5% HCl solution. The organic layer was collected and dried with anhydrous $MgSO_4$, then concentrated in rotovap to afford 3-(2H-benzo[d][1,2,3]triazol-2-yl)-4-((tert-butoxycarbonyl)oxy)phenethyl methacrylate (5.03 g, 38.4%) as a white powder.

$^1$H NMR (400 MHz, CHLOROFORM-d) δ ppm 1.4-1.54 (m, 9H) 1.87-1.99 (m, 3H) 3.04-3.18 (m, 2H) 4.35-4.50 (m, 2H) 5.56 (s, 1H) 6.07-6.15 (m, 1H) 7.30-7.40 (m, 2H) 7.40-7.46 (m, 2H) 7.87-7.97 (m, 2H) 8.10 (s, 1H).

Example 4

Synthesis of 5-chloro-9-oxo-1-((trimethylsilyl)oxy)-9,10-dihydroacridin-3-yl methacrylate (TMS-acridone) by the General Reaction Scheme

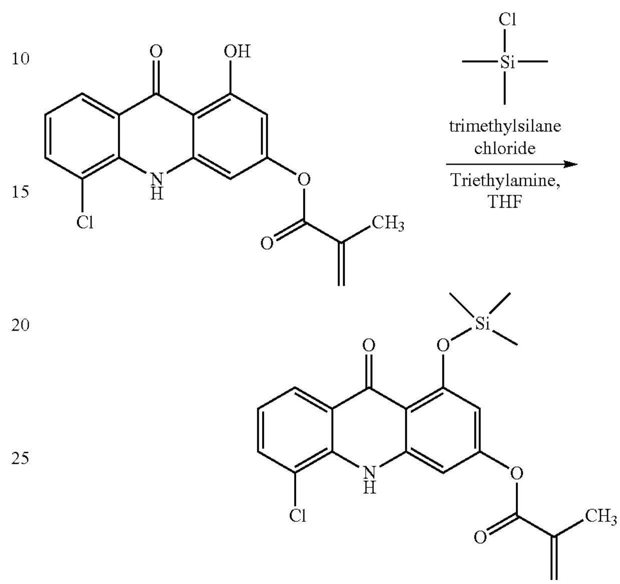

A 250-mL round bottom flask equipped with a magnetic stirrer was dried in heat oven overnight and cooled to room temperature. Next, 5-chloro-1-hydroxy-9-oxo-9,10-dihydroacridin-3-yl methacrylate (5 g, 15.1 mmol, 1 equiv.) and triethylamine (1.83 g, 18.1 mmol, 1.2 equiv.) were added into the flask with a septum. Anhydrous THF (100 mL) was injected into the flask with a syringe. The flask was cooled in a 0° C. ice bath. Trimethylchlorosilane (1.97 g, 18.1 mmol, 1.2 equiv.) was injected into the flask slowly. The reaction was stirred overnight, and solvent was removed from a rotovap and the solid was dissolved in anhydrous diethyl ether. The solution was passed through a celite plug to remove triethylamine hydrochloride. The solution was concentrated in a rotovap and dried in a vacuum oven overnight to afford 5-chloro-9-oxo-1-((trimethylsilyl)oxy)-9,10-dihydroacridin-3-yl methacrylate (4.9 g, 81%) as a yellow solid.

Examples 5-8 and Comparative Examples A and B

A monomeric mixture was made by mixing the following components, listed in Table 1 at amounts per weight.

TABLE 1

| Formulation | Comp. Ex. A | Comp. Ex. B | Ex. 5 | Ex. 6 | Ex. 7 | Ex. 8 |
|---|---|---|---|---|---|---|
| Tris | 28 | 28 | 28 | 28 | 28 | 28 |
| Ma2D37 | 6 | 6 | 6 | 6 | 6 | 6 |
| M1EDS6 | 15 | 15 | 15 | 15 | 15 | 15 |
| NVP | 34 | 34 | 34 | 34 | 34 | 34 |
| EGDMA | 0.1 | 0.1 | 0.1 | 0.1 | 0.1 | 0.1 |
| HEMA | 1 | 1 | 1 | 1 | 1 | 1 |
| DMA | 7 | 7 | 7 | 7 | 7 | 7 |
| Hexanol | 7.38 | 7.38 | 7.38 | 7.38 | 7.38 | 7.38 |
| IMVT | 0.02 | 0.02 | 0.02 | 0.02 | 0.02 | 0.02 |
| Irgacure 819 | 0.50 | 0.50 | 0.50 | 0.50 | 0.50 | 0.50 |

TABLE 1-continued

| | Formulation | Comp. Ex. A | Comp. Ex. B | Ex. 5 | Ex. 6 | Ex. 7 | Ex. 8 |
|---|---|---|---|---|---|---|---|
| UV blockers | UV416 | 1 | 1 | 1 | 1 | 1 | 1 |
| | SA | — | 1 | — | — | — | 0 |
| | TMS-SA of Example 1 | — | — | 0.75 | — | — | 1 |
| | Eoc-SA of Example 2 | — | — | — | 1 | — | 0 |
| | Boc-SA of Example 3 | — | — | — | — | 1 | 0 |
| Blue Blocker | TMS-acridone of Example 4 | — | — | — | — | — | 0.1 |
| Curing Method | Cure time/radiation (min/mW) | 28/4.2 | 28/4.2 | 25/5.8 | 28/4.2 | 28/4.2 | 28/4.2 |
| Lens Characterization | CBCA | 37 | X* | 38 | X | 39 | 39 |
| | UV Class | II | X* | I | II** | I | I |
| | UVA Transmittance % | 24 | X* | 8.9 | 18.6 | 9.97 | 3.96 |
| | UVB Transmittance % | 1.1 | X* | 0.1 | 0.48 | 0.15 | 0.13 |

*The lens did not cure.
**The UV blocker was not fully deprotected.

Preparation of monomer mixture: The monomers listed in Table 1 for each example were mixed and stirred in a brown polypropylene bottle for 30 minutes at room temperature.

Monomer casting and curing: Each of the monomer mixtures was carried into a nitrogen-filled glove box. The monomer mixture was cast on an anterior mold with a pipette and covered with a posterior mold. The assembled mold with the casted monomer mixture was sent into a UV curing box in the glovebox. The assembled mold was cured at the curing times and UV irradiation set forth in Table 1. After UV irradiation, the assembled mold was transferred to outside of the glovebox.

Lens extraction and hydration: The contact lens was released from the assembled mold and soaked in a series of solutions. The contact lens was first soaked in a solution of 50:50 isopropanol/water for 10 minutes, then 100% isopropanol for 30 minutes, then 50:50 isopropanol/water for 10 minutes, then DI water for 10 minutes twice. The extracted lens was transferred to a borate buffer solution in a glass vial and autoclaved.

According to an aspect of the present disclosure a method for preparing a contact lens containing an ultraviolet (UV) blocker comprises:

(a) polymerizing under ultraviolet polymerization conditions a monomeric mixture comprising (i) one or more contact lens-forming comonomers, and (ii) one or more UV blockers comprising a phenolic group having a protected hydroxyl moiety and one or more ethylenically unsaturated reactive groups to obtain a polymerization product comprising the one or more UV blockers comprising a phenolic group having a protected hydroxyl moiety, and (b) deprotecting the protected hydroxyl moiety of the one or more UV blockers of the polymerization product.

In non-limiting illustrative embodiments, as may be combined with one or more of the preceding paragraphs, polymerizing the monomeric mixture under ultraviolet polymerization conditions is carried out for a time period of 5 to 50 minutes.

In non-limiting illustrative embodiments, as may be combined with one or more of the preceding paragraphs, the one or more contact lens-forming comonomers comprise one or more hydrophilic comonomers.

In non-limiting illustrative embodiments, as may be combined with one or more of the preceding paragraphs, the one or more hydrophilic comonomers are selected from the group consisting of an unsaturated carboxylic acid, an acrylamide, a vinyl lactam, a hydroxyl-containing-(meth) acrylate, a hydrophilic vinyl carbonate, a hydrophilic vinyl carbamate, a hydrophilic oxazolone, a poly(alkene glycols) functionalized with polymerizable groups and mixtures thereof.

In non-limiting illustrative embodiments, as may be combined with one or more of the preceding paragraphs, the one or more contact lens-forming comonomers comprise one or more silicone-containing comonomers.

In non-limiting illustrative embodiments, as may be combined with one or more of the preceding paragraphs, the one or more silicone-containing comonomers are represented by a structure of Formula I:

(I)

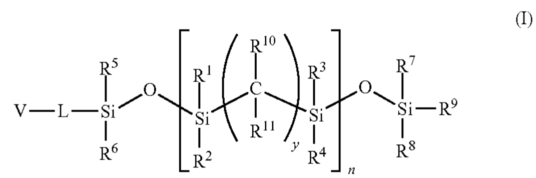

wherein V is an ethylenically unsaturated polymerizable group, L is a linking group or a bond; $R^1$, $R^2$, $R^3$, $R^4$, $R^5$, $R^6$, $R^7$, $R^8$, and $R^9$ are independently H, a $C_1$ to $C_{12}$ alkyl, halo alkyl, a $C_3$ to $C_{12}$ cycloalkyl, a heterocycloalkyl, a $C_2$ to $C_{12}$ alkenyl, a haloalkenyl, or a $C_6$ to $C_{12}$ aromatic; $R^{10}$ and $R^{11}$ are independently H or a $C_1$ to $C_{12}$ alkyl wherein at least one of $R^{10}$ and $R^{11}$ is hydrogen; y is 2 to 7 and n is 1 to 100.

In non-limiting illustrative embodiments, as may be combined with one or more of the preceding paragraphs, the one or more silicone-containing comonomers are represented by a structure of Formula II:

(II)

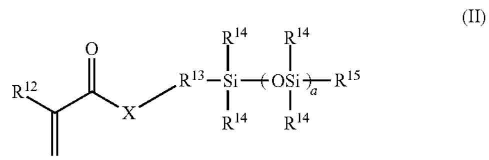

wherein $R^{12}$ is H or methyl; X is O or $NR^{16}$; wherein $R^{16}$ is selected from H, or $C_1$ to $C_4$ alkyl, which may be further substituted with one or more hydroxyl groups; $R^{13}$ is a divalent alkyl group, which may further be functionalized with a group selected from the group consisting of ether groups, hydroxyl groups, carbamate groups and combinations thereof; each $R^{14}$ is independently a phenyl or a $C_1$ to $C_4$ alkyl which may be substituted with fluorine, hydroxyl or ether; $R^{15}$ is a $C_1$ to $C_4$ alkyl; and a is 2 to 50, and in some embodiments 5 to 15.

In non-limiting illustrative embodiments, as may be combined with one or more of the preceding paragraphs, the one or more silicone-containing comonomers are a polysiloxane prepolymer represented by a structure of Formula III:

(III)

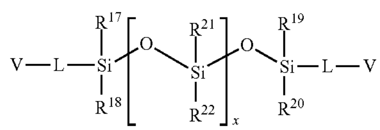

wherein each V is an independently reactive functional end group; $R^{17}$ to $R^{22}$ are independently a straight or branched, substituted or unsubstituted $C_1$-$C_{30}$ alkyl group, a substituted or unsubstituted $C_3$-$C_{30}$ cycloalkyl group, a substituted or unsubstituted $C_4$-$C_{30}$ cycloalkylalkyl group, a substituted or unsubstituted $C_3$-$C_{30}$ cycloalkenyl group, a substituted or unsubstituted $C_6$-$C_{30}$ aryl group, and a substituted or unsubstituted $C_7$-$C_{30}$ arylalkyl group, and L is independently a linking group.

In non-limiting illustrative embodiments, as may be combined with one or more of the preceding paragraphs, the one or more silicone-containing comonomers are represented by a structure of Formula IV:

(IV)

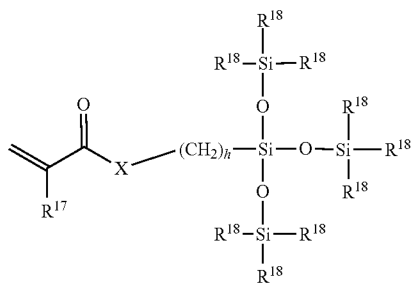

wherein X denotes —O— or —$NR^{19}$—; wherein $R^{19}$ is hydrogen or a $C_1$-$C_4$ alkyl; each $R^{17}$ independently denotes hydrogen or methyl; each $R^{18}$ independently denotes a lower alkyl radical such as a $C_1$-$C_6$ alkyl radical, a phenyl radical or a group represented by:

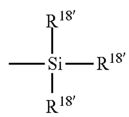

wherein each $R^{18'}$ independently denotes a lower alkyl radical such as a $C_1$-$C_6$ alkyl, or a phenyl radical; and h is 1 to 10.

In non-limiting illustrative embodiments, as may be combined with one or more of the preceding paragraphs, the one or more silicone-containing comonomers are represented by a structure of Formula V:

(V)

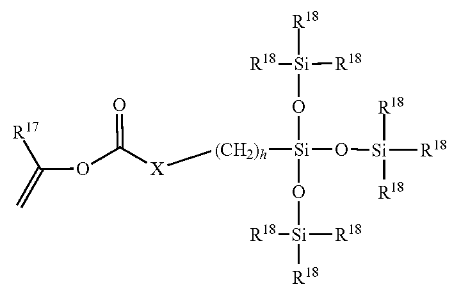

wherein X denotes —$NR^{19}$—; wherein $R^{19}$ denotes hydrogen or a $C_1$-$C_4$ alkyl; $R^{17}$ denotes hydrogen or methyl; each $R^{18}$ independently denotes a lower alkyl radical such as a $C_1$-$C_6$ alkyl, a phenyl radical or a group represented by:

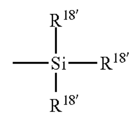

wherein each $R^{18'}$ independently denotes a lower alkyl radical such as a $C_1$-$C_6$ alkyl, or a phenyl radical; and h is 1 to 10.

In non-limiting illustrative embodiments, as may be combined with one or more of the preceding paragraphs, the one or more UV blockers comprising a phenolic group having a protected hydroxyl moiety and one or more ethylenically unsaturated reactive groups comprise a benzotriazole compound having a structure of Formula VI (VI)

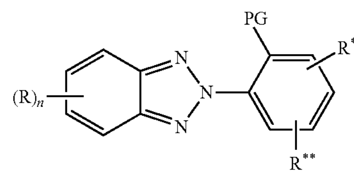

wherein each R is independently hydrogen, a halogen, an —O— group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

In non-limiting illustrative embodiments, as may be combined with one or more of the preceding paragraphs, R and R* are each hydrogen and R** is a (meth)acrylate-containing reactive end group.

In non-limiting illustrative embodiments, as may be combined with one or more of the preceding paragraphs, R** is positioned on the aromatic ring in the para position relative to the protected hydroxyl moiety.

In non-limiting illustrative embodiments, as may be combined with one or more of the preceding paragraphs, the protecting group of the protected hydroxyl moiety comprises one of a trialkylsilane group, a branched alkyloxycarbonyl group, a vinyloxycarbonyl group, a methoxymethyl group, an ethoxycarbonyloxy group and a di-t-alkyl decarbonate group.

In non-limiting illustrative embodiments, as may be combined with one or more of the preceding paragraphs, the one or more contact lens-forming comonomers comprise one or more hydrophilic comonomer, and the one or more UV blockers comprising a phenolic group having a protected hydroxyl moiety and one or more ethylenically unsaturated reactive groups comprise a benzotriazole compound having a structure of Formula VI (VI)

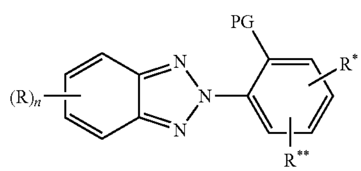

wherein each R is independently hydrogen, a halogen, an —O— group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

In non-limiting illustrative embodiments, as may be combined with one or more of the preceding paragraphs, the monomeric mixture comprises:

about 10 wt. % to about 90 wt. %, based on the total weight of the monomeric mixture, of the one or more contact lens-forming comonomers; and about 0.1 wt. % to 5 wt. %, based on the total weight of the monomeric mixture, of the one or more UV blockers.

In non-limiting illustrative embodiments, as may be combined with one or more of the preceding paragraphs, the monomeric mixture comprises:

about 30 wt. % to about 70 wt. %, based on the total weight of the monomeric mixture, of the one or more contact lens-forming comonomers; and about 0.5 wt. % to about 3 wt. %, based on the total weight of the monomeric mixture, of the one or more UV blockers.

In non-limiting illustrative embodiments, as may be combined with one or more of the preceding paragraphs, the monomeric mixture further comprises one or more blue light blockers comprising a phenolic group comprising a protected hydroxyl moiety and one or more ethylenically unsaturated reactive groups.

In non-limiting illustrative embodiments, as may be combined with one or more of the preceding paragraphs, the one or more blue light blockers are represented by an acridone compound having a structure of Formula VII:

(VII)

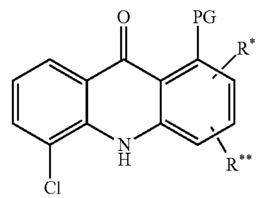

wherein each R is independently hydrogen, a halogen, an —O— group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

In non-limiting illustrative embodiments, as may be combined with one or more of the preceding paragraphs, R and R* are each hydrogen and R** is a (meth)acrylate-containing reactive end group.

In non-limiting illustrative embodiments, as may be combined with one or more of the preceding paragraphs, R** is positioned on the aromatic ring in the para position relative to the protected hydroxyl moiety.

In non-limiting illustrative embodiments, as may be combined with one or more of the preceding paragraphs, the protecting group of the protected hydroxyl moiety comprises one of a trialkylsilane, a branched alkyloxycarbonyl, a vinyloxycarbonyl, a methoxymethyl, and a di-t-alkyl dicarbonate.

In non-limiting illustrative embodiments, as may be combined with one or more of the preceding paragraphs, the monomeric mixture comprises about 0.1 wt. % to about 2 wt. %, based on the total weight of the monomeric mixture, of the one or more blue light blockers.

In non-limiting illustrative embodiments, as may be combined with one or more of the preceding paragraphs, the monomeric mixture further comprises one or more crosslinking agents.

In non-limiting illustrative embodiments, as may be combined with one or more of the preceding paragraphs, the one or more crosslinking agents comprise a bifunctional crosslinking agent.

In non-limiting illustrative embodiments, as may be combined with one or more of the preceding paragraphs, the monomeric mixture comprises about 3 wt. % to about 20 wt. %, based on the total weight of the monomeric mixture, of the one or more crosslinking agents.

In non-limiting illustrative embodiments, as may be combined with one or more of the preceding paragraphs, deprotecting the protected hydroxyl moiety of the one or more UV blockers of the polymerization product comprises subjecting the polymerization product to an extraction process.

In non-limiting illustrative embodiments, as may be combined with one or more of the preceding paragraphs, the extraction process comprises immersing the polymerization product in a series of solvent solutions.

In non-limiting illustrative embodiments, as may be combined with one or more of the preceding paragraphs, the polymerization product is immersed in a first solution comprising a first solvent comprising one or more of a first low molecular weight alcohol solvent, an aliphatic hydrocarbon solvent, a cycloaliphatic hydrocarbon solvent, a ketone solvent, a nitrile solvent, an ether solvent, and an amido group-containing solvent or a blend of water and one or more of the first solvents.

In non-limiting illustrative embodiments, as may be combined with one or more of the preceding paragraphs, the polymerization product is immersed in a first solution comprising a blend of water and a first low molecular weight alcohol solvent for a time period ranging from about 10 minutes to about 40 minutes, wherein the first low molecular weight alcohol solvent is a low molecular weight monohydric alcohol having about 1 to about 13 carbon atoms and/or a molecular weight of no greater than about 200.

In non-limiting illustrative embodiments, as may be combined with one or more of the preceding paragraphs, the polymerization product is immersed in a second solution comprising a second low molecular weight alcohol solvent for a time period ranging from about 10 minutes to about 40 minutes, wherein the second low molecular weight alcohol solvent is a low molecular weight monohydric alcohol having about 1 to about 13 carbon atoms and/or a molecular weight of no greater than about 200.

In non-limiting illustrative embodiments, as may be combined with one or more of the preceding paragraphs, the polymerization product is immersed in a third solution comprising a third solvent comprising a blend of water and a third low molecular weight alcohol solvent for a time period ranging from about 10 minutes to about 40 minutes, wherein the third low molecular weight alcohol solvent is a low molecular weight monohydric alcohol having about 1 to about 13 carbon atoms and/or a molecular weight of no greater than about 200.

In non-limiting illustrative embodiments, as may be combined with one or more of the preceding paragraphs, the polymerization product is immersed one or more times in a series of water solutions.

In non-limiting illustrative embodiments, as may be combined with one or more of the preceding paragraphs, the method further comprises autoclaving the polymerization product after the extraction process.

In non-limiting illustrative embodiments, as may be combined with one or more of the preceding paragraphs, deprotecting the protected hydroxyl moiety of the one or more UV blockers of the polymerization product comprises autoclaving the polymerization product.

In non-limiting illustrative embodiments, as may be combined with one or more of the preceding paragraphs, the method further comprises applying a lid stock to a package containing the polymerization product immersed in an aqueous packaging solution prior to subjecting the contact lens to a step of autoclaving.

In non-limiting illustrative embodiments, as may be combined with one or more of the preceding paragraphs, autoclaving the polymerization product is carried out at a temperature of about 120° C. or higher for at least about 5 minutes.

In non-limiting illustrative embodiments, as may be combined with one or more of the preceding paragraphs, the contact lens is a soft contact lens.

In non-limiting illustrative embodiments, as may be combined with one or more of the preceding paragraphs, the contact lens is a hydrogel contact lens.

In non-limiting illustrative embodiments, as may be combined with one or more of the preceding paragraphs, the contact lens is a rigid gas permeable contact lens.

In non-limiting illustrative embodiments, as may be combined with one or more of the preceding paragraphs, the contact lens demonstrates sufficient blocking of UV to meet at least FDA Class I specifications for UV blocking.

According to an another aspect of the present disclosure, a contact lens comprises one or more UV blockers comprising a phenolic group comprising a deprotected hydroxyl moiety which is an extracted and/or autoclaved, ultraviolet cured polymerization product of a monomeric mixture comprising (a) one or more contact lens-forming comonomers, and (b) one or more ultraviolet (UV) blockers comprising a phenolic group having a protected hydroxyl moiety and one or more ethylenically unsaturated reactive groups.

In non-limiting illustrative embodiments, as may be combined with one or more of the preceding paragraphs, the one or more contact lens-forming comonomers comprise one or more hydrophilic comonomers.

In non-limiting illustrative embodiments, as may be combined with one or more of the preceding paragraphs, the one or more hydrophilic comonomers are selected from the group consisting of an unsaturated carboxylic acid, an acrylamide, a vinyl lactam, a hydroxyl-containing-(meth) acrylate, a hydrophilic vinyl carbonate, a hydrophilic vinyl carbamate, a hydrophilic oxazolone, a poly(alkene glycols) functionalized with polymerizable groups and mixtures thereof.

In non-limiting illustrative embodiments, as may be combined with one or more of the preceding paragraphs, the one or more contact lens-forming comonomers comprise one or more silicone-containing comonomers.

In non-limiting illustrative embodiments, as may be combined with one or more of the preceding paragraphs, the one or more silicone-containing comonomers are represented by a structure of Formula I:

(I)

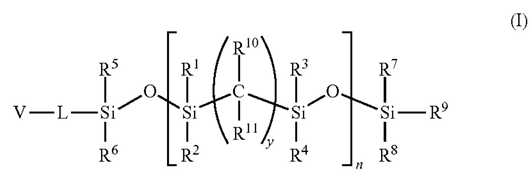

wherein V is an ethylenically unsaturated polymerizable group, L is a linking group or a bond; $R^1$, $R^2$, $R^3$, $R^4$, $R^5$, $R^6$, $R^7$, $R^8$, and $R^9$ are independently H, a $C_1$ to $C_{12}$ alkyl, halo alkyl, a $C_3$ to $C_{12}$ cycloalkyl, a heterocycloalkyl, a $C_2$ to $C_{12}$ alkenyl, a haloalkenyl, or a $C_6$ to $C_{12}$ aromatic; $R^{10}$ and $R^{11}$ are independently H or a $C_1$ to $C_{12}$ alkyl wherein at least one of $R^{10}$ and $R^{11}$ is hydrogen; y is 2 to 7 and n is 1 to 100.

In non-limiting illustrative embodiments, as may be combined with one or more of the preceding paragraphs, the one or more silicone-containing comonomers are represented by a structure of Formula II:

(II)

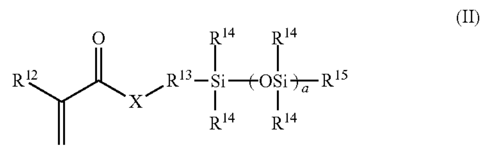

wherein $R^{12}$ is H or methyl; X is O or $NR^{16}$; wherein $R^{16}$ is selected from H, or $C_1$ to $C_4$ alkyl, which may be further substituted with one or more hydroxyl groups; $R^{13}$ is a divalent alkyl group, which may further be functionalized with a group selected from the group consisting of ether groups, hydroxyl groups, carbamate groups and combinations thereof; each $R^{14}$ is independently a phenyl or a $C_1$ to $C_4$ alkyl which may be substituted with fluorine, hydroxyl or ether; $R^{15}$ is a $C_1$ to $C_4$ alkyl; and a is 2 to 50, and in some embodiments 5 to 15.

In non-limiting illustrative embodiments, as may be combined with one or more of the preceding paragraphs, the one or more silicone-containing comonomers are a polysiloxane prepolymer represented by a structure of Formula III:

(III)

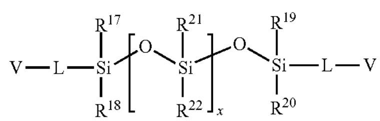

wherein each V is an independently reactive functional end group; $R^{17}$ to $R^{22}$ are independently a straight or branched, substituted or unsubstituted $C_1$-$C_{30}$ alkyl group, a substituted or unsubstituted $C_3$-$C_{30}$ cycloalkyl group, a substituted or unsubstituted $C_4$-$C_{30}$ cycloalkylalkyl group, a substituted or unsubstituted $C_3$-$C_{30}$ cycloalkenyl group, a substituted or unsubstituted $C_6$-$C_{30}$ aryl group, and a substituted or unsubstituted $C_7$-$C_{30}$ arylalkyl group, and L is independently a linking group.

In non-limiting illustrative embodiments, as may be combined with one or more of the preceding paragraphs, the one or more silicone-containing comonomers are represented by a structure of Formula IV:

(IV)

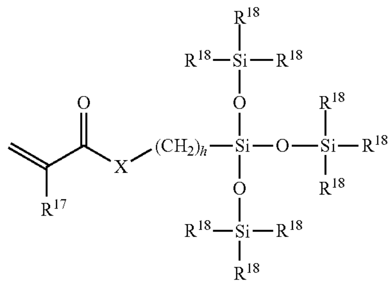

wherein X denotes —O— or $NR^{19}$; wherein $R^{19}$ is hydrogen or a $C_1$-$C_4$ alkyl; each $R^{17}$ independently denotes hydrogen or methyl; each $R^{18}$ independently denotes a lower alkyl radical such as a $C_1$-$C_6$ alkyl radical, a phenyl radical or a group represented by:

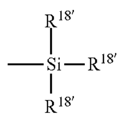

wherein each $R^{18'}$ independently denotes a lower alkyl radical such as a $C_1$-$C_6$ alkyl, or a phenyl radical; and h is 1 to 10.

In non-limiting illustrative embodiments, as may be combined with one or more of the preceding paragraphs, the one or more silicone-containing comonomers are represented by a structure of Formula V:

(V)

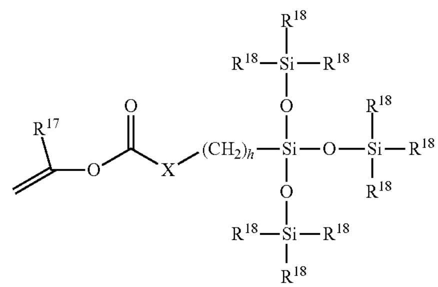

wherein X denotes —$NR^{19}$—; wherein $R^{19}$ denotes hydrogen or a $C_1$-$C_4$ alkyl; $R^{17}$ denotes hydrogen or methyl; each $R^{18}$ independently denotes a lower alkyl radical such as a $C_1$-$C_6$ alkyl, a phenyl radical or a group represented by:

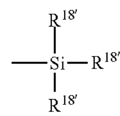

wherein each $R^{18'}$ independently denotes a lower alkyl radical such as a $C_1$-$C_6$ alkyl, or a phenyl radical; and h is 1 to 10.

In non-limiting illustrative embodiments, as may be combined with one or more of the preceding paragraphs, the one or more UV blockers comprising a phenolic group having a protected hydroxyl moiety and one or more ethylenically unsaturated reactive groups comprise a benzotriazole compound having a structure of Formula VI (VI)

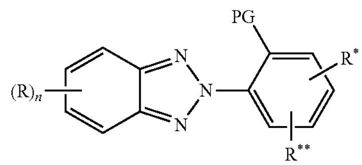

wherein each R is independently hydrogen, a halogen, an —O— group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

In non-limiting illustrative embodiments, as may be combined with one or more of the preceding paragraphs, R and R* are each hydrogen and R** is a (meth)acrylate-containing reactive end group.

In non-limiting illustrative embodiments, as may be combined with one or more of the preceding paragraphs, R** is positioned on the aromatic ring in the para position relative to the protected hydroxyl moiety.

In non-limiting illustrative embodiments, as may be combined with one or more of the preceding paragraphs, the protecting group of the protected hydroxyl moiety comprises one of a trialkylsilane group, a branched alkyloxycarbonyl group, a vinyloxycarbonyl group, a methoxymethyl group, an ethoxycarbonyloxy group and a di-t-alkyl decarbonate group.

In non-limiting illustrative embodiments, as may be combined with one or more of the preceding paragraphs, the one or more contact lens-forming comonomers comprise one or more hydrophilic comonomer, and the one or more UV blockers comprising a phenolic group having a protected hydroxyl moiety and one or more ethylenically unsaturated reactive groups comprise a benzotriazole compound having a structure of Formula VI (VI)

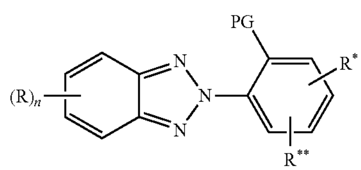

wherein each R is independently hydrogen, a halogen, an —O— group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

In non-limiting illustrative embodiments, as may be combined with one or more of the preceding paragraphs, the monomeric mixture comprises:

about 10 wt. % to about 90 wt. %, based on the total weight of the monomeric mixture, of the one or more contact lens-forming comonomers; and about 0.1 wt. % to 5 wt. %, based on the total weight of the monomeric mixture, of the one or more UV blockers.

In non-limiting illustrative embodiments, as may be combined with one or more of the preceding paragraphs, the monomeric mixture comprises:

about 30 wt. % to about 70 wt. %, based on the total weight of the monomeric mixture, of the one or more contact lens-forming comonomers; and about 0.5 wt. % to about 3 wt. %, based on the total weight of the monomeric mixture, of the one or more UV blockers.

In non-limiting illustrative embodiments, as may be combined with one or more of the preceding paragraphs, the monomeric mixture further comprises one or more blue light blockers comprising a phenolic group comprising a protected hydroxyl moiety and one or more ethylenically unsaturated reactive groups.

In non-limiting illustrative embodiments, as may be combined with one or more of the preceding paragraphs, the one or more blue light blockers are represented by an acridone compound having a structure of Formula VII:

(VII)

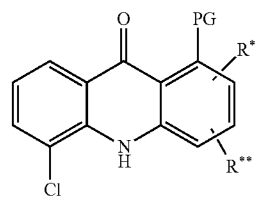

wherein each R is independently hydrogen, a halogen, an —O— group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

In non-limiting illustrative embodiments, as may be combined with one or more of the preceding paragraphs, R and R* are each hydrogen and R** is a (meth)acrylate-containing reactive end group.

In non-limiting illustrative embodiments, as may be combined with one or more of the preceding paragraphs, R** is positioned on the aromatic ring in the para position relative to the protected hydroxyl moiety.

In non-limiting illustrative embodiments, as may be combined with one or more of the preceding paragraphs, the protecting group of protected hydroxyl moiety comprises one of a trialkylsilane, a branched alkyloxycarbonyl, a vinyloxycarbonyl, a methoxymethyl, and a di-t-alkyl dicarbonate.

In non-limiting illustrative embodiments, as may be combined with one or more of the preceding paragraphs, the monomeric mixture comprises about 0.1 wt. % to about 2 wt. %, based on the total weight of the monomeric mixture, of the one or more blue light blockers.

In non-limiting illustrative embodiments, as may be combined with one or more of the preceding paragraphs, the monomeric mixture further comprises one or more crosslinking agents.

In non-limiting illustrative embodiments, as may be combined with one or more of the preceding paragraphs, the one or more crosslinking agents comprise a bifunctional crosslinking agent.

In non-limiting illustrative embodiments, as may be combined with one or more of the preceding paragraphs, the monomeric mixture comprises about 3 wt. % to about 20 wt. %, based on the total weight of the monomeric mixture, of the one or more crosslinking agents.

In non-limiting illustrative embodiments, as may be combined with one or more of the preceding paragraphs, the contact lens is a soft contact lens.

In non-limiting illustrative embodiments, as may be combined with one or more of the preceding paragraphs, the contact lens is a hydrogel contact lens.

In non-limiting illustrative embodiments, as may be combined with one or more of the preceding paragraphs, the contact lens is a rigid gas permeable contact lens.

In non-limiting illustrative embodiments, as may be combined with one or more of the preceding paragraphs, the contact lens demonstrates sufficient blocking of UV to meet at least FDA Class I specifications for UV blocking.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A method for preparing a contact lens containing an ultraviolet (UV) blocker, comprising:

(a) polymerizing under ultraviolet polymerization conditions a monomeric mixture comprising (i) one or more contact lens-forming comonomers, (ii) one or more UV blockers comprising a phenolic group having a protected hydroxyl moiety and one or more ethylenically unsaturated reactive groups, and (iii) one or more blue light blockers comprising a phenolic group comprising a protected hydroxyl moiety and one or more ethylenically unsaturated reactive groups to obtain a polymerization product comprising the one or more UV blockers comprising a phenolic group having a protected hydroxyl moiety and the one or more blue light blockers comprising a phenolic group having a protected hydroxyl moiety; and (b) deprotecting the protected hydroxyl moiety of the one or more UV blockers and the protected hydroxyl moiety of the one or more blue light blockers of the polymerization product.

2. The method according to claim 1, wherein polymerizing the monomeric mixture under ultraviolet polymerization conditions is carried out for a time period of 5 to 50 minutes.

3. The method according to claim 1, wherein the one or more contact lens-forming comonomers are selected from the group consisting of one or more hydrophilic comonomers, one or more silicone-containing comonomers and mixtures thereof.

4. The method according to claim 1, wherein the one or more UV blockers comprising a phenolic group having a protected hydroxyl moiety and one or more ethylenically unsaturated reactive groups comprise a benzotriazole compound having a structure of Formula I:

(I)

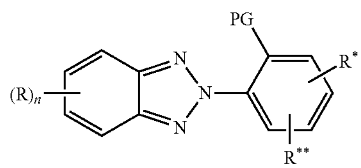

wherein each R is independently hydrogen, a halogen, an —O-group, a nitro group, a nitrile group, a substituted or unsubstituted alkoxy group, a substituted or unsubstituted hydroxyl group, a substituted or unsubstituted amine group, a substituted or unsubstituted carbonyl group, and a substituted or unsubstituted hydrocarbyl group, R* is hydrogen or a substituted or unsubstituted hydrocarbyl group, R** is an ethylenically unsaturated reactive group and PG is a protected hydroxyl moiety.

5. The method according to claim 4, wherein R and R* are each hydrogen and R** is a (meth)acrylate-containing reactive end group.

6. The method according to claim 4, wherein R** is positioned on the aromatic ring in a para position relative to the protected hydroxyl moiety.

7. The method according to claim 4, wherein the protecting group of the protected hydroxyl moiety comprises one of a trialkylsilane group, a branched alkyloxycarbonyl group, a vinyloxycarbonyl group, a methoxymethyl group, an ethoxycarbonyloxy group and a di-t-alkyl decarbonate group.

8. The method according to claim 1, wherein the monomeric mixture comprises:

about 10 wt. % to about 90 wt. %, based on a total weight of the monomeric mixture, of the one or more contact lens-forming comonomers; and about 0.1 wt. % to 5 wt. %, based on the total weight of the monomeric mixture, of the one or more UV blockers.

9. The method according to claim 8, wherein the monomeric mixture comprises:

about 0.1 wt. % to about 2 wt. %, based on the total weight of the monomeric mixture, of the one or more blue light blockers.

10. The method according to claim 1, wherein the one or more blue light blockers are represented by an acridone compound having a structure of Formula II:

(II)

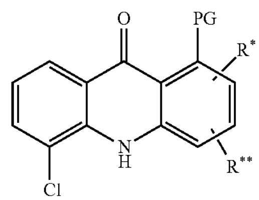

wherein R* is hydrogen or a substituted or unsubstituted hydrocarbyl group, R** is an ethylenically unsaturated reactive group and PG is a protected hydroxyl moiety.

11. The method according to claim 10, wherein R* is hydrogen, R is a (meth)acrylate-containing reactive end group, R is positioned on the aromatic ring in a para position relative to the protected hydroxyl moiety, and the protecting group of the protected hydroxyl moiety comprises one of a trialkylsilane, a branched alkyloxycarbonyl, a vinyloxycarbonyl, a methoxymethyl, and a di-t-alkyl dicarbonate.

12. The method according to claim 1, wherein the monomeric mixture further comprises one or more crosslinking agents.

13. The method according to claim 1, wherein deprotecting the protected hydroxyl moiety of the one or more UV blockers and the protected hydroxyl moiety of the one or more blue light blockers of the polymerization product comprises subjecting the polymerization product to an extraction process.

14. The method according to claim 13, wherein the extraction process comprises immersing the polymerization product in a series of solvent solutions.

15. The method according to claim 13, further comprising autoclaving the polymerization product after the extraction process.

16. The method according to claim 1, wherein deprotecting the protected hydroxyl moiety of the one or more UV blockers and the protected hydroxyl moiety of the one or more blue light blockers of the polymerization product comprises autoclaving the polymerization product.

17. The method according to claim 1, wherein the contact lens demonstrates sufficient blocking of UV to meet at least FDA Class I specifications for UV blocking.

18. The method according to claim 1, wherein the one or more ethylenically unsaturated reactive groups of the one or more UV blockers are a (meth)acrylate-containing reactive end group.

19. The method according to claim 1, wherein the one or more ethylenically unsaturated reactive groups of the one or more blue light blockers are a (meth)acrylate-containing reactive end group.

20. The method according to claim 1, wherein the contact lens is a silicone hydrogel.

* * * * *